United States Patent [19]

Matsunami et al.

[11] Patent Number: 5,740,465
[45] Date of Patent: Apr. 14, 1998

[54] ARRAY DISK CONTROLLER FOR GROUPING HOST COMMANDS INTO A SINGLE VIRTUAL HOST COMMAND

[75] Inventors: Naoto Matsunami, Yokohama; Minoru Yoshida, Odawara; Shoichi Miyazawa, Yokohama; Takashi Oeda, Yokohama; Kiyoshi Honda, Yokohama; Shuji Ohno, Kawasaki, all of Japan

[73] Assignee: Hitachi, Ltd., Tokyo, Japan

[21] Appl. No.: 43,841

[22] Filed: Apr. 7, 1993

[30] Foreign Application Priority Data

| Apr. 8, 1992 | [JP] | Japan | 4-087223 |
| Aug. 26, 1992 | [JP] | Japan | 4-227320 |

[51] Int. Cl.$^6$ ............................................. G06F 13/00
[52] U.S. Cl. .................. 395/825; 395/844; 395/441; 395/421.1
[58] Field of Search .................. 371/10.1, 11.1, 371/49.1, 49.2, 81.1; 395/250, 275, 375, 900, 425, 800, 825, 844, 846, 421.1, 441; 360/98.01

[56] References Cited

U.S. PATENT DOCUMENTS

| 4,346,439 | 8/1982 | Huno et al. | 395/842 |
| 4,437,155 | 3/1984 | Sawyer et al. | 395/425 |
| 4,458,316 | 7/1984 | Fry et al. | 395/250 |
| 4,489,378 | 12/1984 | Dixon et al. | 395/425 |
| 4,583,166 | 4/1986 | Hartung et al. | 395/425 |
| 4,636,946 | 1/1987 | Hartung et al. | 395/425 |
| 4,835,679 | 5/1989 | Kida et al. | 395/375 |
| 4,882,642 | 11/1989 | Tayler et al. | 360/78.11 |
| 4,942,523 | 7/1990 | Gembarowski | 395/185.09 |
| 4,972,364 | 11/1990 | Barrett et al. | 395/425 |
| 5,016,160 | 5/1991 | Lambeth et al. | 395/844 |
| 5,109,500 | 4/1992 | Iseni et al. | 395/425 |
| 5,124,987 | 6/1992 | Milligan et al. | 371/10.1 |
| 5,163,139 | 11/1992 | Haigh et al. | 395/375 |
| 5,251,303 | 10/1993 | Fogg, Jr. et al. | 395/844 |
| 5,255,371 | 10/1993 | Latimer et al. | 395/250 |
| 5,335,330 | 8/1994 | Inoue | 395/375 |

FOREIGN PATENT DOCUMENTS

| 131321 | 6/1987 | Japan. |
| 293355 | 12/1987 | Japan. |
| 53224 | 1/1989 | Japan. |
| 236714 | 9/1990 | Japan. |

OTHER PUBLICATIONS

Lee, E.K. et al. "Performance Consequences of Parity Placement in Disk Arrays" (1991) pp. 190–199.

*Primary Examiner*—Lance Leonard Barry
*Attorney, Agent, or Firm*—Antonelli, Terry, Stout & Kraus, LLP.

[57] ABSTRACT

A plurality of commands which may be sent sequentially from a host computer are interpreted by a host command interpreter to generate a disk command for each disk unit. When these commands make up an access demand for a single continuous area, they are grouped into a single command, which is executed substantially at the same time at each disk unit. Also, a plurality of RMW processing systems having different command issued to disk units are available. A selection condition is detected from the I/O demand information supplied by a host computer, and an optimum one of a plurality of RMW processing systems is selected and executed on the basis of the selection condition.

8 Claims, 25 Drawing Sheets

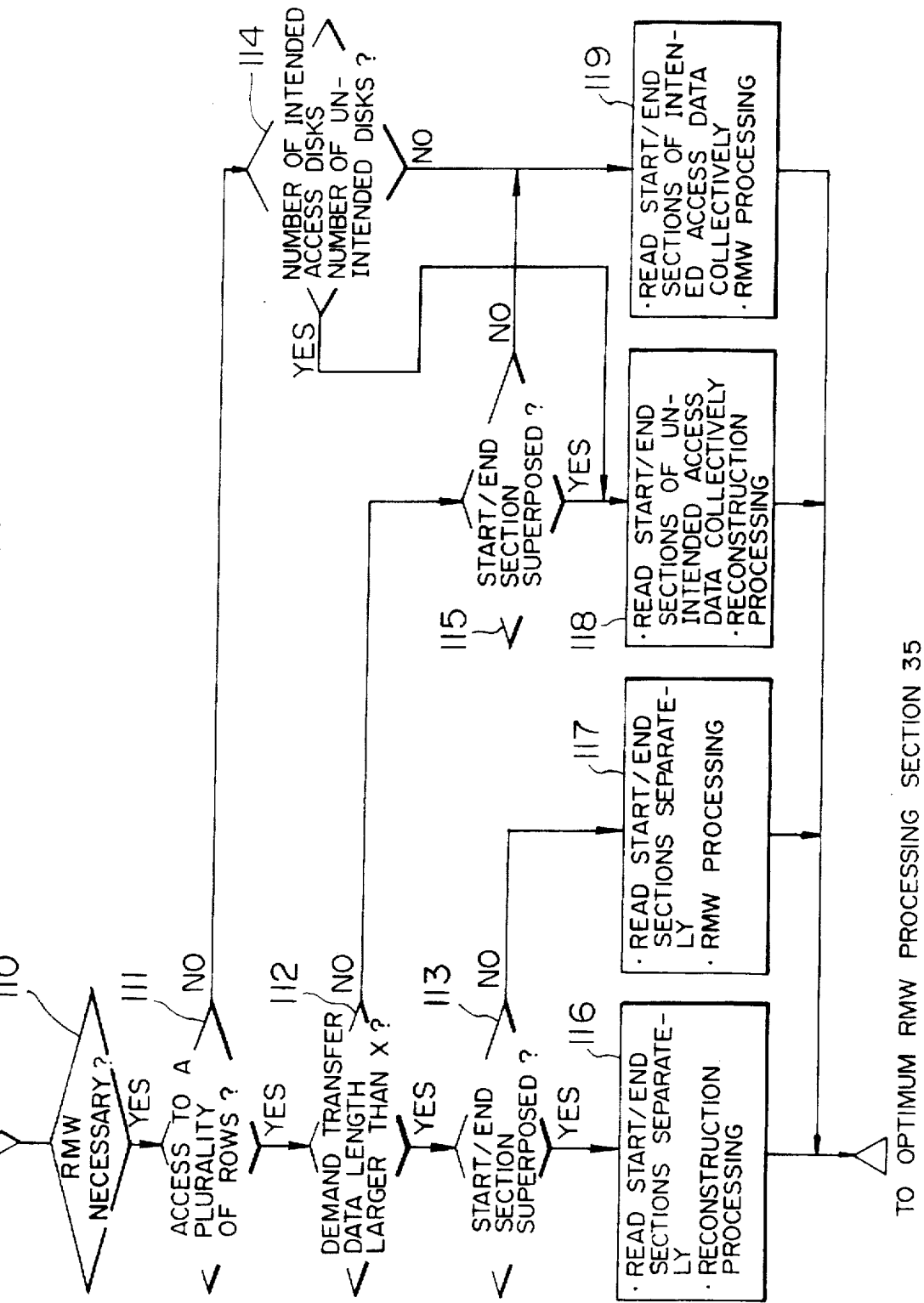

ARRAY DISK CONTROLLER FOR GROUPING HOST COMMANDS INTO A SINGLE VIRTUAL HOST COMMAND

BACKGROUND OF THE INVENTION

The present invention relates to an array disk controller for realizing a high-speed data transfer in an array disk system with a plurality of disk units connected.

An array disk system, which can read and write data in parallel for each row from a plurality of disk units arranged in array and designated according to row and column, is capable of realizing a high processing speed as compared with a disk system configured of a single disk unit.

An array disk system comprises a plurality of disk units and an array disk controller for controlling them. These disk units are required to present an appearance of a single disk unit as viewed from a computer connected as a high-rank system ("host computer"). For this purpose, it is necessary to convert a command issued from the host computer into a command for each disk unit within an array disk controller. Such a data transfer control system is disclosed in JP-A-62-131321. This conventional system will be described with reference to FIG. 2.

The system shown in FIG. 2 comprises means 13 for converting and distributing a command to each disk unit, means 15 for issuing a command to each disk unit and detecting the completion of transfer of data read and written, means 11 for receiving a command from a host computer and notifying the host computer of the end of a command, means 17 for controlling the data transfer between the host computer and each disk unit, and a main controller 16 for controlling each of the above-mentioned means. A plurality of disk units are operated in parallel simultaneously to realize a high-speed data transfer by making a single command from a host computer for a plurality of disk units look like a single command for each of a plurality of disk units.

Further, an array disk system has a multiplicity of disk units connected, so that the disk failure rate increases in proportion to the number of units, thereby posing the problem of a deteriorated reliability. In order to obviate this problem, several data disk units and a single parity disk unit make up a group called a row. Also, data is divided into a plurality of data units called stripes, and a group called a parity group is formed of all the stripes starting from the same logical address of all the disk units in a row. A parity code, i.e., parity information is generated by calculating the exclusive OR of all the data stripes in this parity group, and is stored as parity stripes in a parity disk unit. In this way, data is distributed not merely among a plurality of disk units but is given redundancy. Should a given disk unit go out of order, therefore, data of a malfunctioning disk unit could be restored from the parity information of a parity disk unit. This high-reliability system has been studied for some time.

A system for high-speed control of the reading of a file data over a plurality of continuous fixed-length blocks for a disk system comprising a single disk unit is disclosed in JP-A-64-53224, etc. According to this system, blocks storing file data are checked for continuity when reading the file data, and if there are continuous blocks found, they are read out collectively, thereby making possible a high-speed data transfer with a reduced rotational latency time of the disk system.

A host computer makes access to continuous areas on a logic address for an array disk system. A command is sometimes divided into a plurality of commands and a demand may be issued by continuous transfer for these commands. More specifically, the OS (operating system) of a host computer may handle data divided into units called pages of a predetermined size. In such a case, an access demand for a large amount of data is issued as a plurality of commands to an array disk system. In view of the fact that a plurality of continuous commands are issued by the OS, however, the whole of the original data are often stored continuously in an actual array disk system. A similar operation is caused also when a program executed on a host computer is such that a plurality of data files are generated by the same procedure, in which case these data files are often arranged in continuous areas.

In the former one of the above-mentioned conventional systems, no consideration is given to the processing for a plurality of accesses (hereinafter referred to as a plurality of sequential accesses) made to continuous areas in an array disk system. According to this conventional system, even when sequential continuous access demands are issued to an array disk system, the system processes them as a single command. Regardless of an access to a continuous area, therefore, a disk rotational latency time occurs for each command, thereby posing the problem of a considerably reduced processing speed.

The same former one of the conventional systems requires generation of parity information as described above. When data is written only in a some disk units in a row, therefore, it is necessary to read the old data and the old parity information written in the area to be read before writing the data, and to calculate the exclusive OR of them and the new data to be written in order to generate new parity information. Further, the process for reading the old data for generating parity information is executed for each command, and latency of two disk rotations is required for each write command. The problem therefore is a further decrease in the processing speed as well as the rotational latency for each command mentioned above.

Furthermore, in the former one of the above-mentioned conventional systems, the problem is posed of a further reduced processing speed in addition to the rotational latency for each command.

Also, according to the former conventional system, in which continuous data are distributed among a plurality of disk units on a logical address from a host computer, data are not arranged continuously in each disk unit. Conventional disk units normally have the functions of reading not only particular data but also continuous data following the particular data in advance at the time of issuing a read command and transferring the data thus read immediately (prefetch function) without any idle time of the mechanism including the seek or rotational latency when the same area is accessed by the next command. In an array disk system which has no data continuously arranged in a disk unit, however, the prefetch function of each disk unit is not effectively performed. As a result, the idle time of the mechanism is developed for each access, thereby leading to the problem of a decreased processing speed in a plurality of sequential accesses as compared with the disk system configured of a single disk unit.

According to the latter one of the above-mentioned conventional systems, on the other hand, a system for collective reading of continuous blocks for a disk system is based on the assumption that files are stored in a single disk unit. No consideration is given, therefore, for when a file is divided into a plurality of stripes and recorded distributively among a plurality of disk units as in an array disk system. Also, mention is made only about a file being divided into fixed-size blocks, without considering the case where a file is divided into variable-length block sizes by the OS of a host computer. Further, reference is made only to the reading operation, but the writing operation with a reduced processing speed is not taken into account for an array disk system.

The above-mentioned problems will hereinafter be referred to collectively as the first group of problems.

The concept of an array disk system is already disclosed, and Berkeley School, The University of California has developed a method of classification of the above-mentioned disk array (Redundant Arrays of Inexpensive Disks (RAID)) at five levels for storage of redundant data to improve the data reliability.

Further, a system for access to a disk unit at "levels 4 and 5" according to the above-mentioned classification method has been disclosed by several research institutes. An example shows that "the read access achieves parallelism but the write access requires RMW (read-modify-write) processing including the parity data at level 4. The write access demand or request from a host computer is limited to only one at a time in an array disk system at level 4 where the parity data for all rows are arranged in a predetermined single column of disk unit." As seen from this, how to attain a high speed and optimization of the RMW processing is a problem at "levels 4 and 5" where the access to a plurality of disk units is controlled by striping size. An article entitled "Performance Consequences of Parity Placement in Disk Arrays" published by Berkeley School suggests two methods of realizing the RMW processing.

An ordinary RMW access control system used at the time of generation of a write access demand from a host computer in an array disk system will be explained below with reference to FIGS. 3, 4, 5 and 6.

FIG. 3 is a diagram showing a data access area. In FIG. 3, numeral 98 designates a data area intended for access (access demand) from a host computer on a row, and numeral 99 unintended access data area on the same row. FIGS. 4 and 5 show block diagrams of an array disk system with a data transfer flow for ordinary RMW processing. In FIGS. 4 and 5, numeral 1 designates a host computer, numeral 2 an array disk system, numeral 4 a host interface controller, numeral 3 an array disk controller including a data controller 5, a command controller 6 (having an MPU and a direct memory access controller (DMAC)), a data buffer 7, a disk interface controller 8 and a parity data generator 10, and numeral 9 a group of disk units.

When data is written in a part of disk units on a row from the host computer 1, the parity information for the particular row is normally generated from the old data (including the parity data) and the new data of the disk units into which the data is to be written. As shown in FIG. 3, when a write access demand arises against an intended access data area 98 distributed among disk units (9a1, 9b1, 9c1, and 9d1 on a given row (the disk unit 9b1 being for the parity data on the particular row), a normal system would operate in the manner mentioned below.

1. The array disk controller 3 acknowledges that the I/O demand or request from the host computer 1 is a write access demand against the intended access data area 98 distributed among the disk units 9a1 to 9d1 and reads the old data (including the old parity data) from the disk units 9a1 to 9d1. The old data is applied to the parity data generator 10, while the write data (new data) from the host computer 1 is supplied to the data buffer 7 and the parity data generator 10.

2. The new parity data generated from the new data and old data input to the parity data generator 10 and the new data in the data buffer 7 are written into corresponding ones of the disk units 9a1 to 9d1, respectively.

The execution of the above-mentioned RMW processing secures the consistency and redundancy of striping data making up a parity group in an array disk system.

The parity information on a given row may alternatively be generated from unintended access data and new data for the particular row. This method is called "the reconstruction method". According to the reconstruction method, the following operation is performed:

1. The array disk controller 3 acknowledges that an I/O demand from the host computer 1 is a write access demand against the intended access data area 98 distributed among the disk units 9a1 to 9d1, and reads the unintended data (not including the old parity data) of an unintended access data area 99. The unintended data is applied to the parity data generator 10, and write data (new data) from the host computer 1 is supplied to the data buffer 7 and the parity data generator 10.

2. The new parity data generated from the new data and the unintended data input to the parity data generator 10, together with the new data of the data buffer 7, are written into corresponding disk units 9a1 to 9d1, respectively.

By executing the above-mentioned RMW processing, a write access processing is completed for securing the consistency and redundancy of the striping data constituting a parity group in an array disk system.

These systems, however, pose the problem that no consideration is given to the access to the data area covering a plurality of rows but only to data in a single row as shown in FIG. 3.

More specifically, when a write demand is generated for an access area covering a plurality of rows as shown in FIG. 21, for example, the RMW processing is necessary for the data transfer start/end sections in FIG. 21. The optimization of such a processing system, however, has not be studied. Also, with the multiplication of user applications, the selection of an RMW processing system is expected to have a great effect on the processing performance of an array disk system.

All the problems described above will hereinafter be collectively referred to as "the second group of problems".

SUMMARY OF THE INVENTION

An object of the present invention is to provide an array disk controller in which the unrequired disk rotational latency time of the drive in a disk unit is prevented at the time of a plurality of sequential accesses in order to write a plurality of stripes making up data into a plurality of disk units of an array disk system.

Another object of the present invention is to provide an array disk controller in which the read operation for parity generation is eliminated at the time of a plurality of sequential accesses accompanying the write operation.

A further object of the present invention is to provide an array disk controller in which data transfer is effected without any idle time of the mechanism of the disk unit for the write as well as read operation due to the prefetch function of each disk unit.

Still another object of the present invention is to prepare a plurality of RMW processing systems in order to cope with the factors considered to determine the RMW processing performances in an array disk system, and select the optimum processing system from the I/O information originated in the host computer, thereby realizing the optimization of the RMW processing.

In order to obviate the above-mentioned problems of the first group, according to the present invention, there is provided an array disk controller comprising: means for receiving a command from a host computer and notifying the end of the command to the host computer, means for interpreting and converting a command issued from the host computer into a command for each disk unit, means for activating the disk command for each disk unit and detecting the end of read or write data transfer by the disk command, means for controlling the data transfer between the host computer and each disk unit, and means for controlling all the means mentioned above. The array disk controller further comprises means for storing temporarily in a queue and controlling the commands continuously issued by the host computer, means for grouping and regarding as one command a plurality of commands stored in the queue and converting one grouped command into a disk command to be applied to each disk unit, and means for storing and controlling the information on the grouped command and the conversion information for converting the grouped command into a command for each disk unit.

Further, in order to obviate the problems of the first group, according to another aspect of the present invention, there is provided an array disk controller comprising first control means for controlling, to read in advance from a disk unit, the continuous data following the data handled by a command issued from a host computer, data storage means for storing the data read in advance within the array disk controller or each disk unit, and second control means for controlling the input and output of the data read in advance to and from the data storage means.

The command queue management means stores a succession of commands for a plurality of sequential accesses issued continuously from a host computer. The command storage means interprets the commands and, acknowledging that they represent a sequential access demand, notifies the commands to the command grouping means. The command grouping means regards and groups these commands as a single command, while at the same time keeping in store the correspondence thereof in the conversion information management means. Further, the command grouping means converts a single grouped command to a disk command for each disk unit, while at the same time keeping in store the correspondence in the conversion information management means.

As a result of the above-mentioned operation of each part, a plurality of sequential access commands are converted into a single sequential access command in an array disk controller, and thus all data is able to be handled to handle continuously and collectively. The disk rotational latency is thus eliminated, thereby realizing a high-speed data transfer.

Further, the command grouping means operates in the manner mentioned below at the time of writing.

First, as in the preceding case, a plurality of sequential write access commands are grouped. A data area for writing all the data stripes in a parity stripe is cut out. In other than this data area, as in the preceding case, data is read for parity generation, and after parity generation, a write operation is performed. In the above-mentioned data area, on the other hand, parity information is generated directly from a data stripe and only the write operation is performed. In view of the fact that data are handled continuously and collectively by grouping them as mentioned above, the data area increases and the writing of most of the data eliminates the read operation for parity generation, thereby realizing a high-speed data transfer in write mode.

Also, once the command interpretation means interprets a command issued by the host computer and detects that a disk unit storing a data area following the one handling the particular command is not for storing the data area handled by the command, then the means for controlling the advance data reading issues a read demand to the particular disk unit in response to the detection. This disk unit, which does not store the data demanded by the host computer, sends out the data immediately following the one demanded by the host computer to the prefetch data storage means in response to a read demand issued by the prefetch controller. In the process, the data transfer read controller applies the read data to the prefetch data storage means. When the host computer demands sequential data read operation following the data accessed in the preceding process upon termination of the command issued by the host computer, the prefetch controller decides that the data input to the prefetch data storage means is demanded, thus immediately sending out the particular data from the prefetch data storage means to the host computer. In this way, the lack of actual access to a disk unit realizes a high-speed data transfer at the time of read operation.

As explained above, the read operation is performed for parity generation also in write mode, in which case the prefetch controller performs the prefetch operation as in the preceding case. As a result, even when the prevailing write command is finished and the next sequential write command is issued from a host computer, the fact that the old data required for parity generation is stored in the prefetch data storage means permits parity data generation without access to a disk unit and reading. Thus, it is possible to write the data immediately, thereby realizing a high-speed data transfer in write mode.

If the problems of the second group are to be solved, it is necessary to consider when a host computer issues a write access demand to a data area covering a plurality of rows in an array disk system. This write access is made in any of the three methods that will be mentioned. In this explanation, "the start section", "the mid-transfer section" and "the end section" represent data areas such as designated by numerals 94, 95 and 96, respectively, in FIG. 21. More specifically, "the start section" includes the head of a data area and represents the data to be stored in a part of the disk units on the particular row. "The end section" includes the end of a data area and is indicative of data to be stored in a part of the disk units on the particular row, and "the mid-transfer section" the data to be stored in all the disk units of the particular row between "the start section" and "the end section".

① (a) The RMW operation is performed for the data in the start section.

(b) The write operation is performed for the data in the mid-transfer section.

(c) The RMW operation is performed for the data in the end section.

② (a) The read operation is performed for the data in the start section.

(b) The data in the start section and the mid-transfer section are collectively subjected to the write operation for each disk unit.

(c) The RMW operation is performed for the data in the end section.

③ (a) The data in the start section and the end section are collectively subjected to the read operation for each disk unit (in which case the unnecessary data in the mid-transfer section are read undesirably).

(b) The data in the start section, the mid-transfer section and the end section are collectively subjected to the write operation for each disk unit.

The write processing method ① is the one for executing the prior art faithfully, while the processing methods ② and ③ are applications considering an improved write processing speed.

FIGS. 24A to 24C are diagrams showing the write processing timings for each RMW processing system. Of these diagrams, FIG. 24A is a timing chart for execution of the processing method shown in ①, FIG. 24B a timing chart for execution of the processing system shown in ②, and FIG. 24C a timing chart for execution of the processing system shown in ③.

In FIGS. 24A to 24C, numeral 40 designates an interface protocol processing such as SCSI, numeral 41 a data transfer processing, numeral 42 a seek delay and a disk rotational latency, and numeral 43 a disk rotational latency. The signs attached to the procedure of the three processing methods correspond to ①(a), ①(b), ①(c), ②(a), ②(b), ②(c), ③(a) and ③(b), respectively, in FIGS. 24A to 24C.

As will be understood from FIGS. 24A to 24C, the number of times a command is issued from a command controller 6 to a disk I/F 8 is 5 for the method ① in FIG. 24A, 4 for the method ② in FIG. 24B, and 2 for the method ③ in FIG. 24C, showing that the number of times a command is issued, i.e., the number of accesses made to a disk unit has an effect on the data transfer performance. In view of the fact that the amount of data transferred is not taken into consideration in FIGS. 24A to 24C, however, it is not always true that a method with a smaller number of times a command is issued has the shortest time of data transfer.

In other words, in spite of several methods that have been proposed for realizing an RMW processing, these methods are not necessarily sufficient to realize a high speed of write access processing.

More specifically, when the RMW processing responding to a write access demand from a host computer involves an access required of a data area covering a plurality of rows in an array disk system, the number of times a command is issued from an array controller to each disk unit varies with the processing system involved. The interface protocol processing time relating to the command issue, therefore, is considered to have a great effect on the performance of an array disk system. As explained above, however, the mere suggestion relating to the number of times an access is made fails to give full consideration to the improvement in the general performance of the RMW processing in an array disk system due to the factors mentioned above.

The problems of the second group mentioned above can be obviated by an array disk system with a write control system comprising a plurality of RMW processing systems having different command execution procedures and different numbers of command issues to disk units, RMW processing selection means for selecting an appropriate one of the RMW processing systems and a selection information generator for generating the selection information providing the information for controlling the RMW processing selection means thereby to realize an improved performance of the RMW processing.

According to the present invention, in order to select an appropriate one of a plurality of RMW processing systems, for example, an array disk system detects the demanded transfer data length from the I/O demand information supplied by a host computer, and generates selection information from the result of comparison between the data transfer processing time required for data transfer and the interface protocol processing time. And, by selecting an RMW processing system suitable for large-capacity data transfer or small-capacity data transfer from the selection information, an improved RMW processing performance is achieved.

According to another aspect of the present invention, an array disk system detects an RMW processing area, and with the stripe distribution of the access area as selection information, an RMW processing system suitable for each access area distribution is selected to realize an improved RMW processing performance.

A configuration example of an array disk system according to the present invention comprises a plurality of RMW processing systems having different numbers of times a command is issued to disk units at the time of generation of an RMW access, transfer data length detection means for detecting a demanded transfer data length, means for detecting an RMW processing area, means for detecting the position of a magnetic head, and RMW processing selection means for selecting the most appropriate one of a plurality of RMW processing systems in response to the result of detection by the aforementioned means as input information, thereby realizing a high-speed RMW processing specific to an array disk.

According to still another aspect of the present invention, the optimization of RMW processing is further promoted by generation of selection control information from a plurality of types of detection information. Further, it is possible to attach the order of priority to the detection information in generating the selection control information from a plurality of types of detection information.

An array disk system according to the present invention comprises a plurality of RMW processing systems having different command execution procedures and different numbers of command issues to disk units, wherein an improved RMW processing performance is realized by selecting an optimum one of the RMW processing systems by the processing operation described below.

Specifically, a selection information generator detects the demanded transfer data length, the RMW processing area and the position of the magnetic head as conditions for selection from the I/O demand information supplied by a host computer. When the selection information represents the demanded transfer data length, for example, such an RMW processing system is selected that the read operation suitable for large-capacity data transfer is realized by two independent read commands or that the read operation suitable for small-capacity data transfer is realized by one read command.

The RMW processing selection means selects an optimum one of a plurality of RMW processing systems with the above-mentioned selection information as input information.

The disk I/O demand information generation means is for generating disk I/O demand information for realizing an RMW processing with an optimized number of command issues and an optimized command execution procedure for disk units according to the selection conditions.

When selection information is provided by the RMW processing area, a data storage area in a disk unit is detected from the demanded transfer data length and the RMW processing is optimized from the particular data storage area.

BRIEF DESCRIPTION OF THE DRAWINGS

FIG. 27 is flowchart showing an example of processing selection according to the third embodiment of the present invention shown in FIG. 22.

DESCRIPTION OF THE PREFERRED EMBODIMENTS

First, an array disk system according to the present invention will be described with reference to the accompanying drawings.

Figure 1:
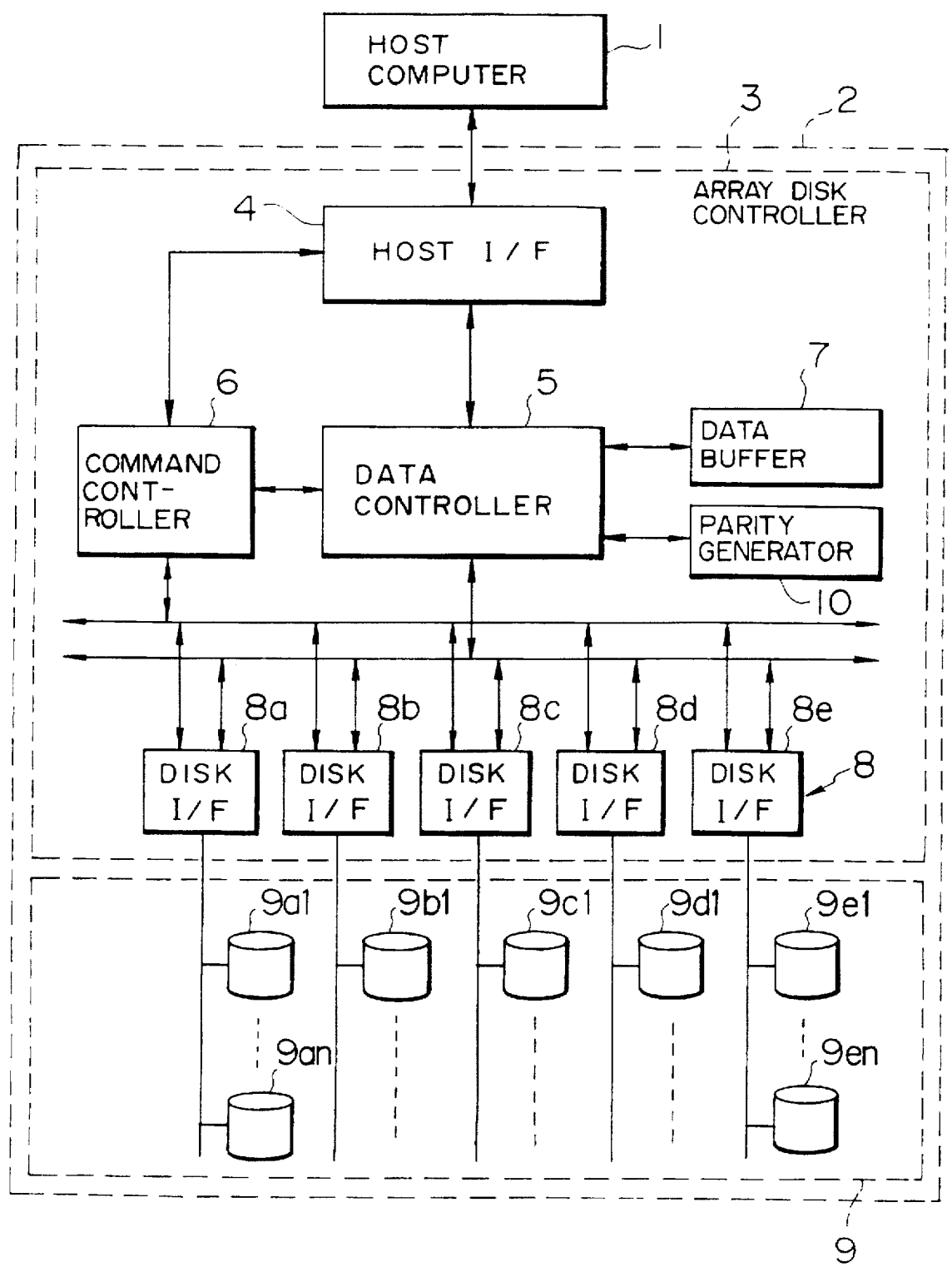
FIG. 1 is a block diagram showing an example of a general array disk system to which the present invention is applicable.

FIG. 1 is a block diagram showing a configuration of an array disk system. Numeral 1 designates a host computer connected with an array disk system 2, numeral 3 an array disk controller for controlling disk units 9a1 to 9en formed in array, numeral 4 a host interface (hereinafter referred to as "the host I/F") connecting the array disk system 2 and the host computer 1, numeral 5 a data controller for controlling the data flow in the array disk system 2, numeral 6 a command controller for interpreting the commands sent out from the host computer 1 and effecting such a command control as converting a command into one adaptable to the disk units 9a1 to 9en, numeral 7 a data buffer, numerals 8a to 8e a disk interface (hereinafter referred to as "the disk I/F") for connecting the disk units in array and the disk array controller 3, and numeral 10 a parity generator for generating parity information provided for preventing the loss of data in case when any of the disk units 9a1 to 9en runs out of order.

In FIG. 1, the array disk controller 3 transfers the read command or write command received at the host I/F 4 from the host computer 1 to the command controller 6. The command controller 6 interprets the command thus received and selects a disk unit to be accessed, thereby generating a command for the particular disk unit.

For avoiding the misunderstanding in the explanation that follows, the command sent from the host computer 1 is referred to as the host command, and the command specific to a disk unit sent to the disk units 9a1 to 9en as the disk command.

The disk command generated in the command controller 6 is transferred to a related disk unit through the disk I/F connected therewith thereby to execute the read or write operation. In the process, a plurality of disk units may be selected and operated at the same time. As a result, an operation higher in performance is expected than that of a single disk unit.

Now, an embodiment of the present invention will be explained with reference to the accompanying drawings.

Figure 6:
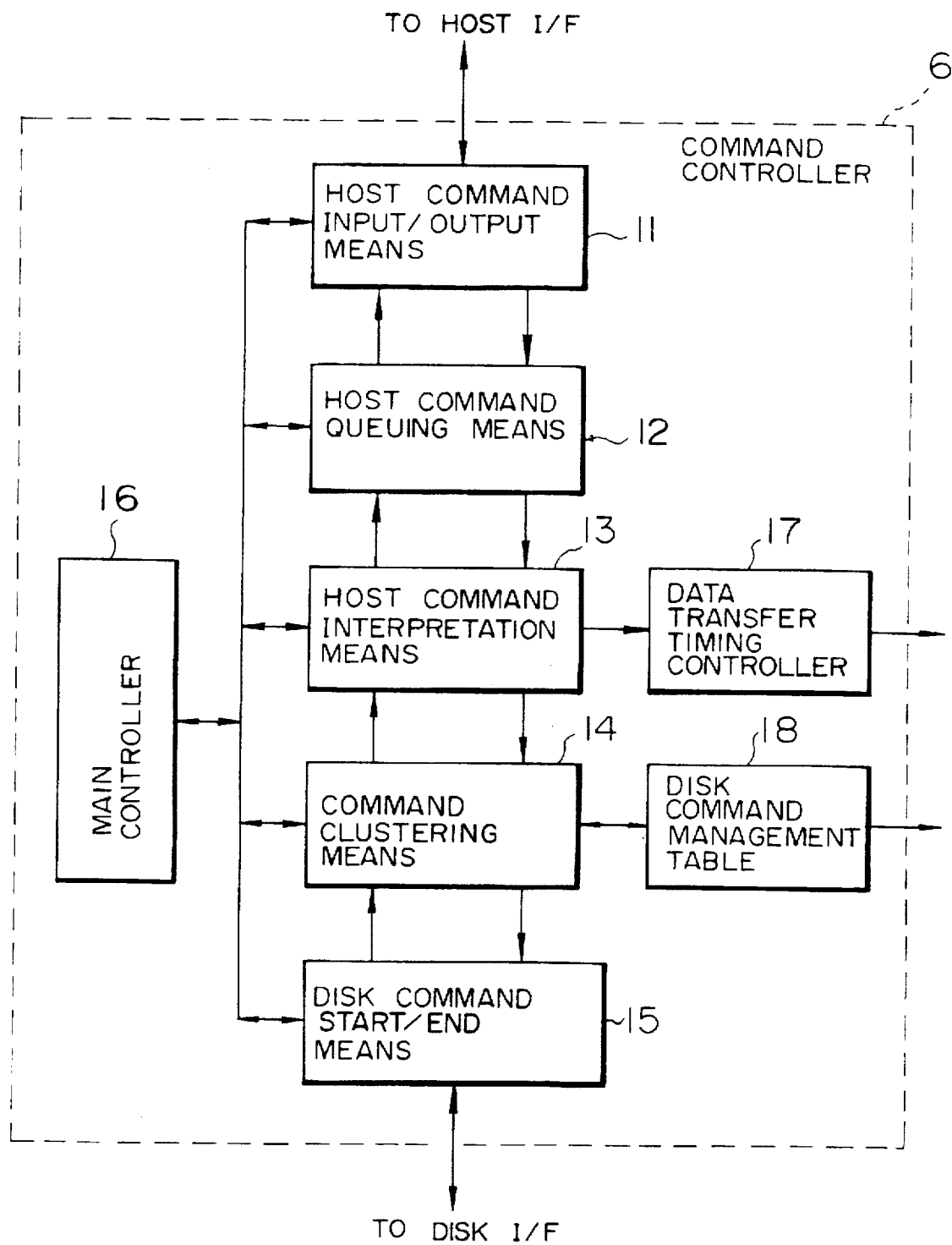
FIG. 6 is a block diagram showing a first embodiment of an array disk controller according to the present invention.

FIG. 6 is a block diagram showing a specific configuration of the command controller 6 in FIG. 1 according to an embodiment of the array disk controller of the present invention. Numeral 11 designates host command input-output means for receiving a host command from the host computer 1 through the host I/F 4 and reporting the end of a command, numeral 12 host command queuing means for storing and managing the received host command temporarily in a queue, numeral 13 host command interpretation means for interpreting the received host command and generating a disk command, numeral 14 command clustering means for generating a command cluster by integrating a plurality of host commands, numeral 15 command start/end means for issuing a generated disk command to each disk unit and receiving a command end from each disk unit, numeral 16 main controller for managing and controlling the whole command controller 6, numeral 17 data transfer timing controller for giving an instruction on an appropriate transfer timing to the data controller 5 (FIG. 1), and numeral 18 a disk command management table for managing the correspondence between the command cluster generated in the command clustering means and the original disk command.

Now, the operation of the array disk system 2 will be explained.

In FIG. 1, the array disk system 2 appears to be a large-capacity disk unit from the host computer 1. Assume that a plurality of divided commands providing continuous data accesses are sent out to the array disk system 2 from the host computer 1. This access demand occurs in the cases mentioned below.

Firstly, restraints due to the OS are involved. When a long sequential file is handled and the OS fails to handle the data of this file collectively, then the data is divided to issue a command a plurality of times.

Secondly, the application features may be the cause. When a given application is for preparing or reading a plurality of files regularly, they are often arranged on continuous logical addresses. Therefore, sequential accesses are issued a plurality of times.

The operation of issuing sequential accesses a plurality of times from the host computer 1 to the array disk system 2 as mentioned above will be explained with reference to FIG. 7.

Figure 7:
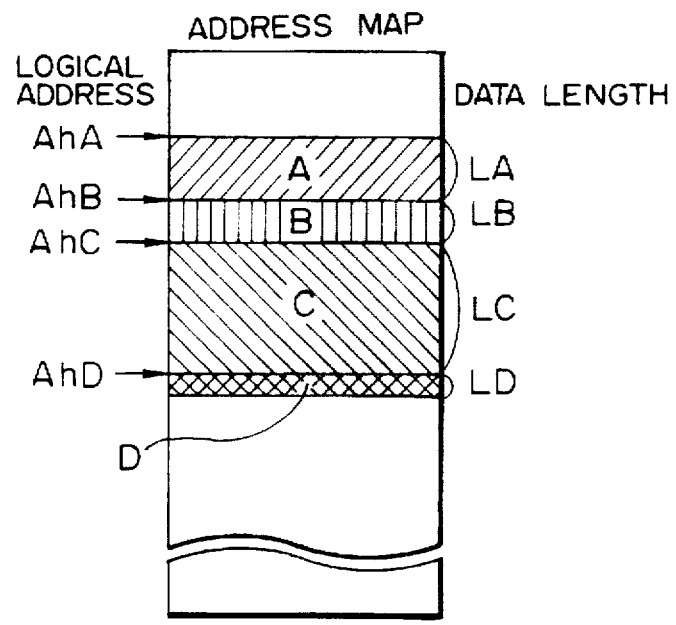
FIG. 7 is a diagram schematically showing a logical address map in the array disk system 2 as viewed from a host computer 1.

FIG. 7 shows a logical address map of the array disk system 2 as viewed from the host computer 1. In FIG. 7, assume that the host computer 1 has continuously issued to the array disk system 2 four host commands including a command A on the logical address AhA and data length LA, a command B on the logical address AhB and data length LB, a command C on the logical address AhC and data length LC, and a command D on the logical address AhD and data length LD. The data handled by these host commands A, B, C and D are arranged continuously on an address map as shown in FIG. 7.

First, the host command A is supplied through the host I/F 4 (FIG. 1) to the command input-output means 11 in the command controller 6 shown in FIG. 6, and is transferred by the command input-output means 11 to host command queuing means 12. Unless filled with command queues therein, the host command queuing means 12 receives the host command A and stores it at the last section of the command queue, and unless the host command interpretation means 13 is executing, picks up a host command from the head of the command queue and sends it to the host command interpretation means 13.

Now, assume that the host command A is stored at the head of the command queue in the host command queuing means 12 and the host command interpretation means 13 is not executing. Then, the host command A is read from the particular command queue and transferred to the host command interpretation means 13, where the command is interpreted and converted into a disk command. In the process, the host command queuing means 12 notifies the host computer 1 of the receivability of the next host command by the host I/F 4. At the same time, the host I/F 4 becomes ready to receive the next host command, and the host computer 1, if the next host command is sendable, sends out the host command B followed by the host commands C, D, etc., continuously each time of notification from the host command queuing means 12. The host command queuing means 12 stores these host commands sequentially in a command queue, and the host command interpretation means 13 interprets and converts into a disk command these host commands B, C and D like the host command A.

When a plurality of host commands are transmitted continuously from the host computer 1 and stored in a command queue in this way, the command clustering means 14 does not immediately transmit to a target disk unit and execute the disk commands interpreted at the host command interpretation means 13, but temporarily stores them in a disk command management table 18 (FIG. 6). Unless these continuously received host commands A to D make up continuous data accesses to continuous logical addresses, the command clustering means 14 takes disk commands from the disk command management table 18, sends them to the disk command start/end means 15, and issues these commands to each disk unit in order to have the commands executed in appropriate order.

Figure 8:
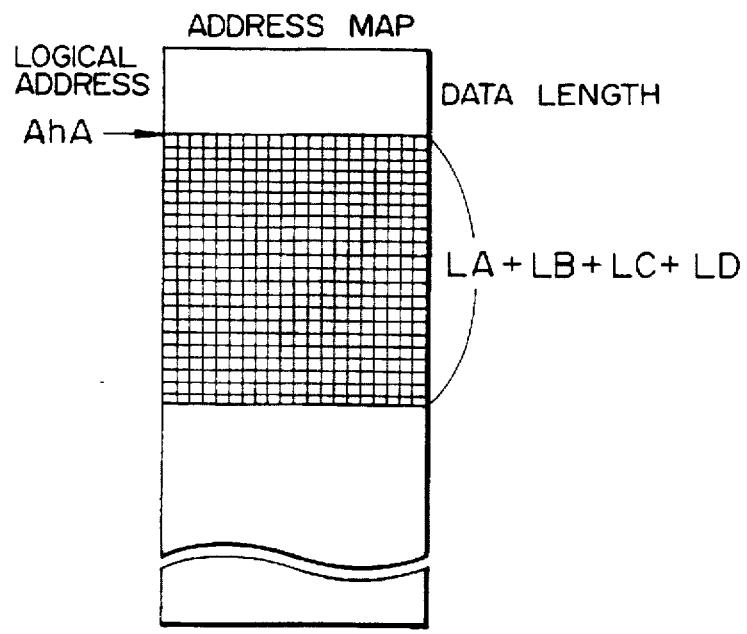
FIG. 8 is a diagram showing a logical address map of an array disk system after execution of the command clustering according to the first embodiment shown in FIG. 6.

When these host commands A to D make up accesses to continuous areas as shown in FIG. 7, on the other hand, the command clustering means 14 groups the host commands A to D. Specifically, as shown in FIG. 8, the host commands A, B, C and D sent out of the host computer 1 are equivalently converted into a single host command (which is referred to as "the command clustering") with a logical address AhA and a data length of (LA+LB+LC+LD).

The host command thus clustered is sent to command interpretation means 13 and converted into a disk command, which is issued to a related disk unit by the disk command start/end means 15.

Figure 9:
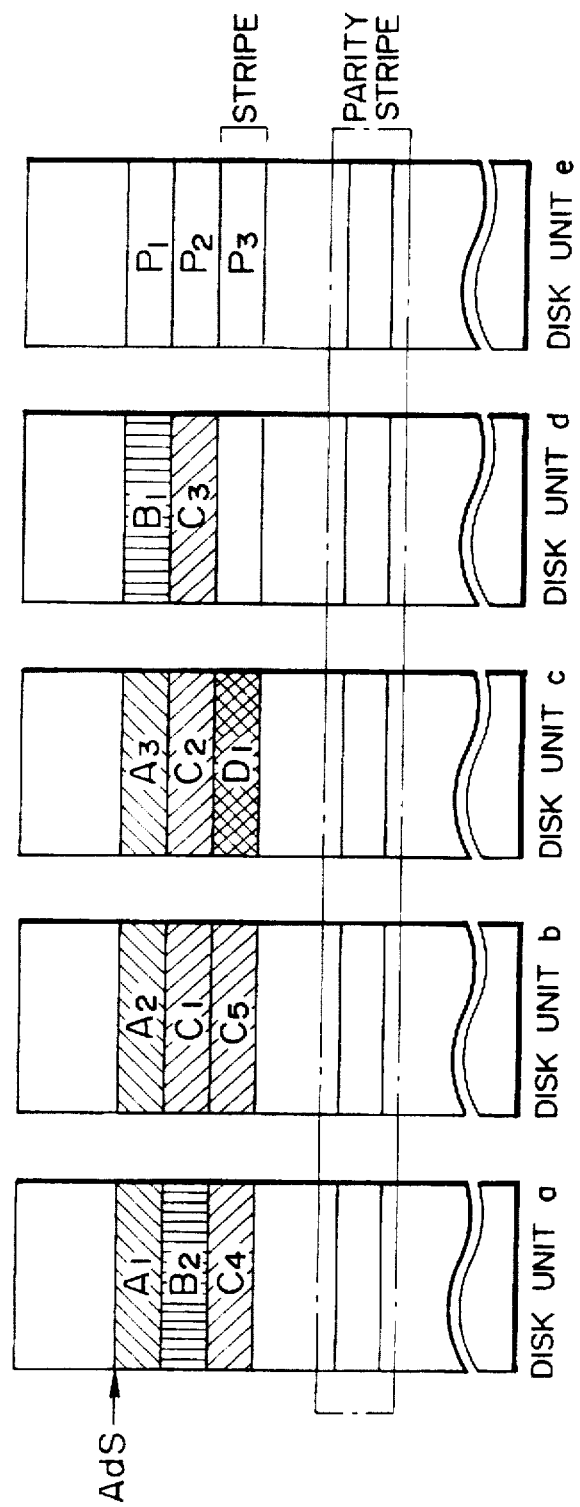
FIG. 9 is a diagram showing a logical address map of each disk unit according to the first embodiment shown in FIG. 6.

FIG. 9 is a diagram showing a mapping of each host command to a logical address of each disk unit. For simplification, five disk units a to e are assumed to be connected in parallel on one row (which means that five disk I/Fs 8a to 8e are inserted in the disk array control system 3, each connected to a corresponding disk unit). Any desired number of disk units is of course connectable in parallel, and so is the number of the disk units (on a column) connected to a disk I/F.

Among the five disk units a to e, the units a to d are for reading and writing data, while the disk unit e is for reading and writing parity data.

The data handled by a host command is divided into unit blocks called the stripes shown in FIG. 9 and is recorded in disks. The host command A is assumed to be divided into three stripes A1, A2 and A3, which are recorded in the disk units a, b and c. The data handled by the host commands B, C and D are also divided into two, five and one stripe respectively in the same manner, and are recorded in the disk units a to e as shown in FIG. 9.

Now, an array disk controller according to the present invention used herein is divided into the read and write operations and will be explained in detail with reference to the host commands shown in FIG. 7.

First, reference is made to the read operation. For comparison, explanation will be made about the case in which command clustering is not effected as in the prior art.

The read data of the host command A is divided into stripes A1, A2 and A3 as described above and are recorded in disk units a, b and c. As a result, the data are read by disk commands Aa, Ab and Ac at the disk units a, b and c, respectively. In a similar fashion, as for the host command B, stripes B1 and B2 are read by the disk commands Bd and Ba from the disk units d and a. Similarly, referring to the host command C, the stripes C1 and C5 are read by the disk command Cb from the disk unit b, and the stripes C2, C3 and C4 by the disk commands Cc, Cd and Ca from the disk units c, d and a, respectively. Further, as for the host command D, the stripe D1 is read by the disk command Dc from the disk unit C.

The above-mentioned fact will be explained with reference to FIG. 10. When the host commands A, B, C and D are successively supplied from the host computer 1 through the host I/F 4 to a command converter 6, the command converter 6 stores them temporarily in host command queuing means 12. Host command interpretation means 13 first issues disk commands Aa, Ab and Ac from the host command A to the disk units a, b and c, so that these commands are executed on the disk units a, b and c almost at the same time. The disk units a, b and c, upon receipt of a disk command, interprets it, and after a seek operation and a disk rotational delay, detects a sector intended on a disk and reads a target data. In this way, the data A1, A2 and A3 read from the disk units a, b and c are coupled with the read data of the host command A and sent to the host computer 1 thereby to complete the execution of the host command A.

At this time, the host command B has already been converted, and a disk command Bd may be issued to the vacant disk unit d almost at the same time as the host command A. In view of the fact that the disk unit a is in the process of executing the host command A, however, the disk command Ba cannot be issued and is required to wait for the completion of the execution. Upon confirmation of complete execution, the disk command Ba is issued to the disk unit a. As shown in FIG. 9, in spite of the fact that the data areas of the stripes A1 and B2 are continuous in the disk unit a, the head address of the stripe B2 is passed during the overhead time such as command interpretation, with the result that a delay occurs by a rotation of disk. This is also the case with the host commands C and D. Generally, when a host command is executed for a number n of continuous sequential readings, maximum of latency of n disk rotations occurs, thereby deteriorating the processing speed.

Now, the read operation by an array disk controller according to the present invention used in FIG. 6 will be explained.

In FIG. 6, the host commands A, B, C and D are grouped (clustered) temporarily by the command clustering means in the command controller 6 as mentioned above, and after attaching the appearance of an equivalently single host command as shown in FIG. 8, are converted into disk commands and are issued to the disk units. This process is shown in FIG. 11.

Figure 11:
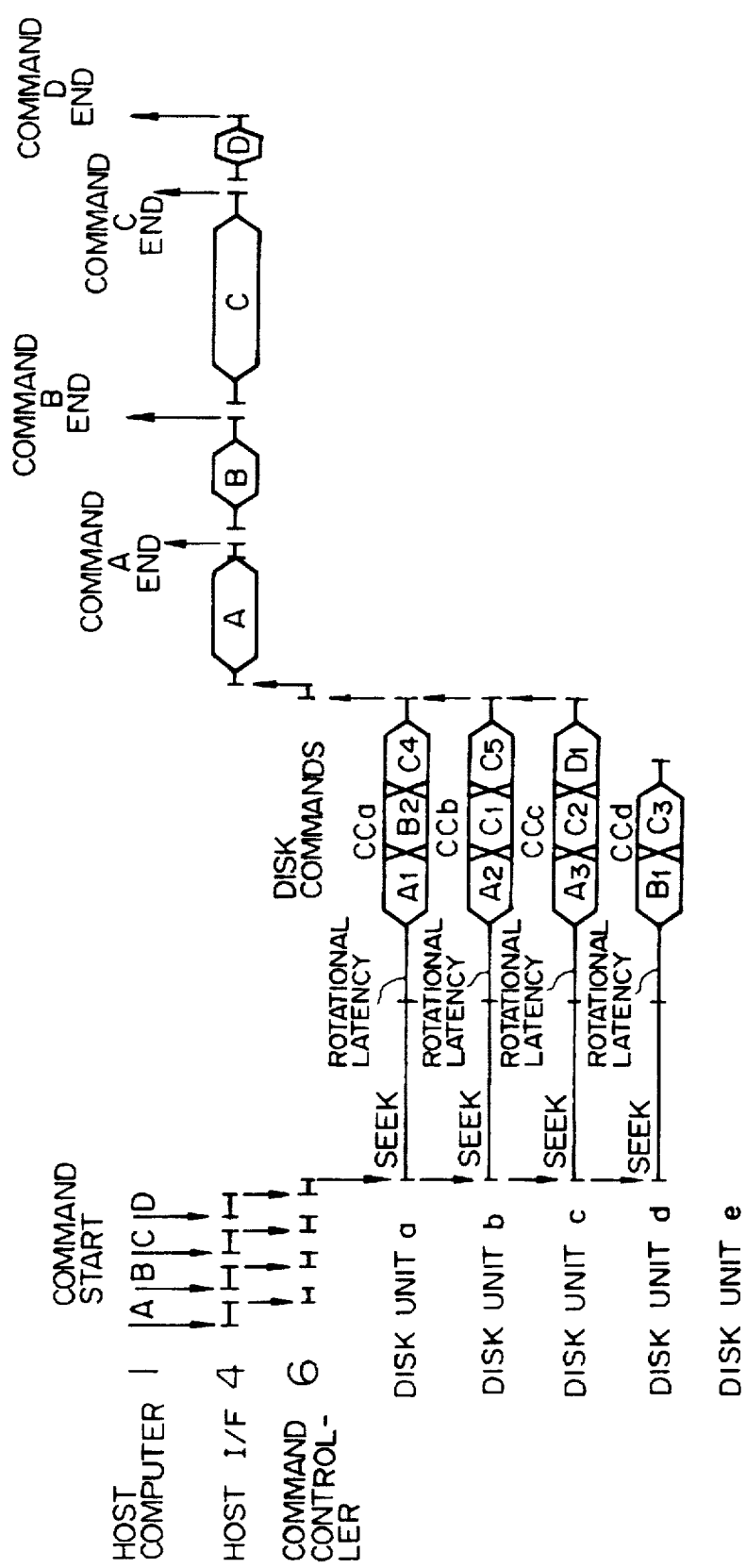
FIG. 11 is a timing chart showing multiple read operations according to the first embodiment shown in FIG. 6.

In FIG. 11, the command controller 6 receives the host commands A, B, C and D from the host computer 1 and interprets them. Judging this as a sequential access to continuous areas, the command clustering means 14 executes the command clustering as described above. The host command interpretation means 13 interprets a stripe area for each of the disk units a to d to be read by the single host command thus clustered, and according to the result of interpretation, generates disk commands CCa, CCb, CCc and CCd for the respective disk units a to d, issuing them to the disk units a to d respectively. The disk command CCa is for sequentially reading the stripes A1, B2 and C4 in that order on the disk unit 9a, the disk command CCb for the stripes A2, C1 and C5 in that order on the disk unit 9b, the disk command CCc for the stripes A3, C2 and D1 in that order on the disk unit 9c, and the disk command CCd for the stripes B1 and C3 in that order on the disk unit 9d.

These disk commands CCa to CCd are issued simultaneously to the disk units a to d respectively, and after seek and rotational latency, respective objects are read. The resulting data are transferred to the data buffer 7 (FIG. 1) temporarily. The data are read by the data transfer timing means 17 for the stripes A1, A2, ..., C5 and D1 in that order from the data buffer 7 on the basis of the management information stored in the disk command management table 18 (FIG. 6), and are transferred to the host computer 1, thus finishing the host commands A, B, C and D sequentially.

By execution of the command clustering in this way, latency of only one rotation occurs when a number n of sequential access commands from the host computer 1 are issued to the array disk system 2. Latency of the number of rotations is thus reduced by (n−1) as compared with the conventional systems mentioned above. Generally, the rotational latency time is very long as compared with the data transfer time, and therefore the improvement in performance due to latency of the reduced number of rotations is very conspicuous.

Now, the above-mentioned effect will be described more in detail with reference to specific examples.

Assume that the average seek time for each disk unit is 15 milliseconds, the average rotational latency time 8 milliseconds, the rotational latency for each disk rotation 16 milliseconds, and the data transfer speed of a disk unit 3 Mbytes/sec. Also, assume that four disk units are used for read operation, the host computer 1 can issue an access demand in four host commands of 16 Kbytes to 64-Kbyte continuous areas, and that each of the 16-Kbyte access is uniformly distributed among the four disk units to read the stored data. Further, assume that the overhead time including command interpretation is very small and negligible.

According to the conventional systems described above, the processing time T' is given as $T'$=(Average seek time+Average rotational latency time)+(16-Kbyte data transfer time÷4)×4+(Rotational latency for one rotation)×3=76.3 (milliseconds)

In the array disk controller according to the present embodiment, on the other hand, the processing time T is expressed as $T$=(Average seek time+Average rotational latency time)+(64-Kbyte data transfer time÷4)=28.3 (milliseconds)

This shows that the processing speed according to the present embodiment is three times greater than according to conventional systems. The greater the effect of this embodiment, the larger the number of sequential access commands to continuous areas from the host computer 1.

Figure 10:
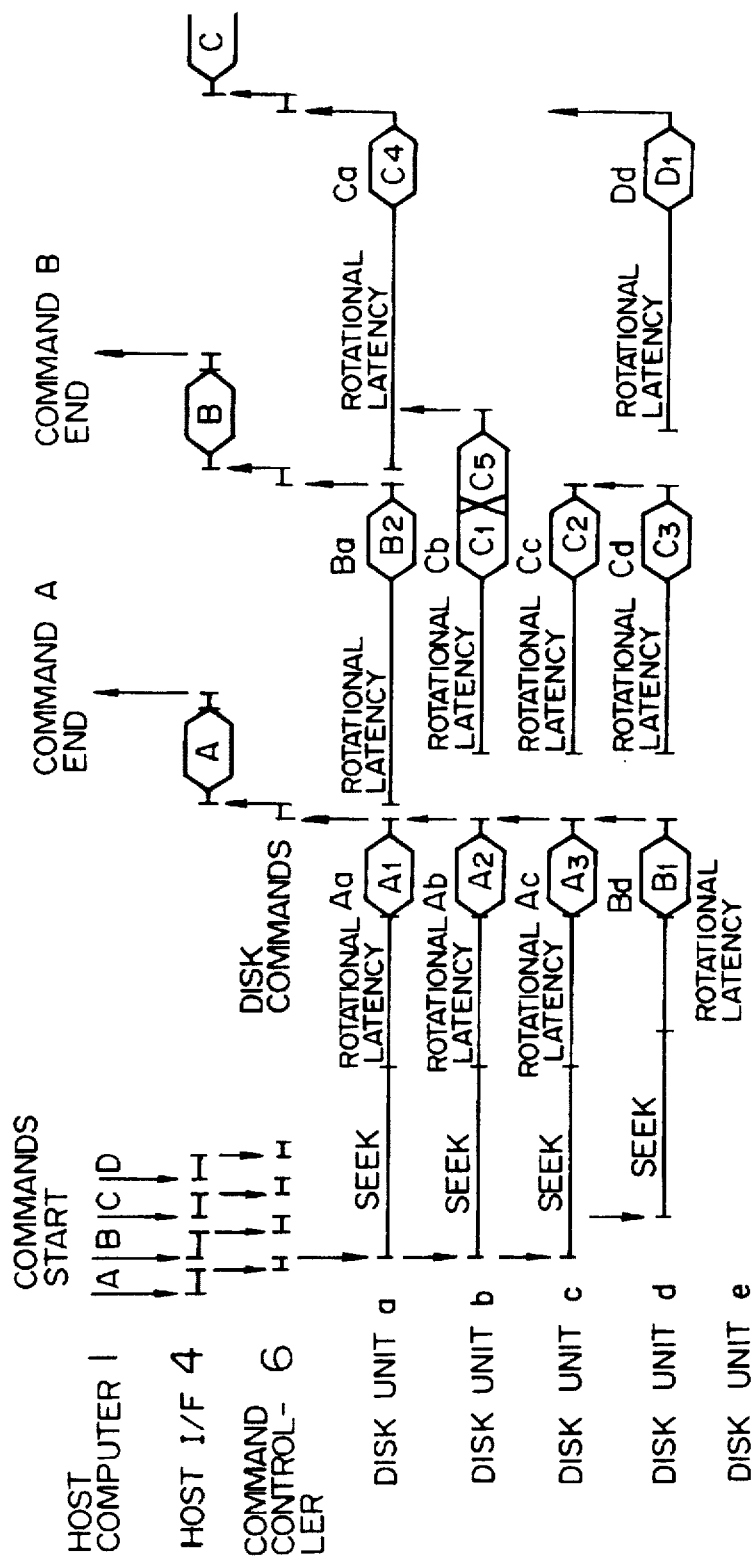
FIG. 10 is a timing chart showing multiple read operations according to the prior art.

Further, according to the present embodiment, as will be apparent from the comparison between FIGS. 10 and 11, the busy time of the disk units is small as compared with the conventional systems. When the next host command is received during the execution of the above-mentioned host commands, much waiting time occurs before execution of the received command in the conventional systems. According to the present embodiment, by contrast, the busy time of each disk unit is so small that only a small waiting time is allowed before execution of the next command. As a consequence, the throughput of the processes is improved as a whole, and the average response time to commands as viewed from the host computer 1 is decreased.

Now, the operation in write mode will be explained.

As in read mode, the host commands shown in FIG. 7 are mapped in each disk unit as shown in FIG. 9 for write operation. In write mode, the above-mentioned parity data is required to be generated, for which different control methods are used between read and write operations. A method of generating parity data will be explained with reference to FIG. 9.

In an array disk system 2 according to the present embodiment, one of five disk units is assigned as a parity disk unit for each row. As described above, the disk unit e provides such a parity disk unit in FIG. 9. A parity is generated in a group called the parity group with a stripe as a unit. The stripes starting with the same logical address of the disk units a to e make up a parity group, and the exclusive OR of these data is used as parity data. In FIG. 9, for example, the stripes A1, A2, A3, B1 and P1 constitute one parity group, and the stripe P1 of parity data is generated from the exclusive OR of the stripes A1, A2, A3 and B1.

Figure 12:
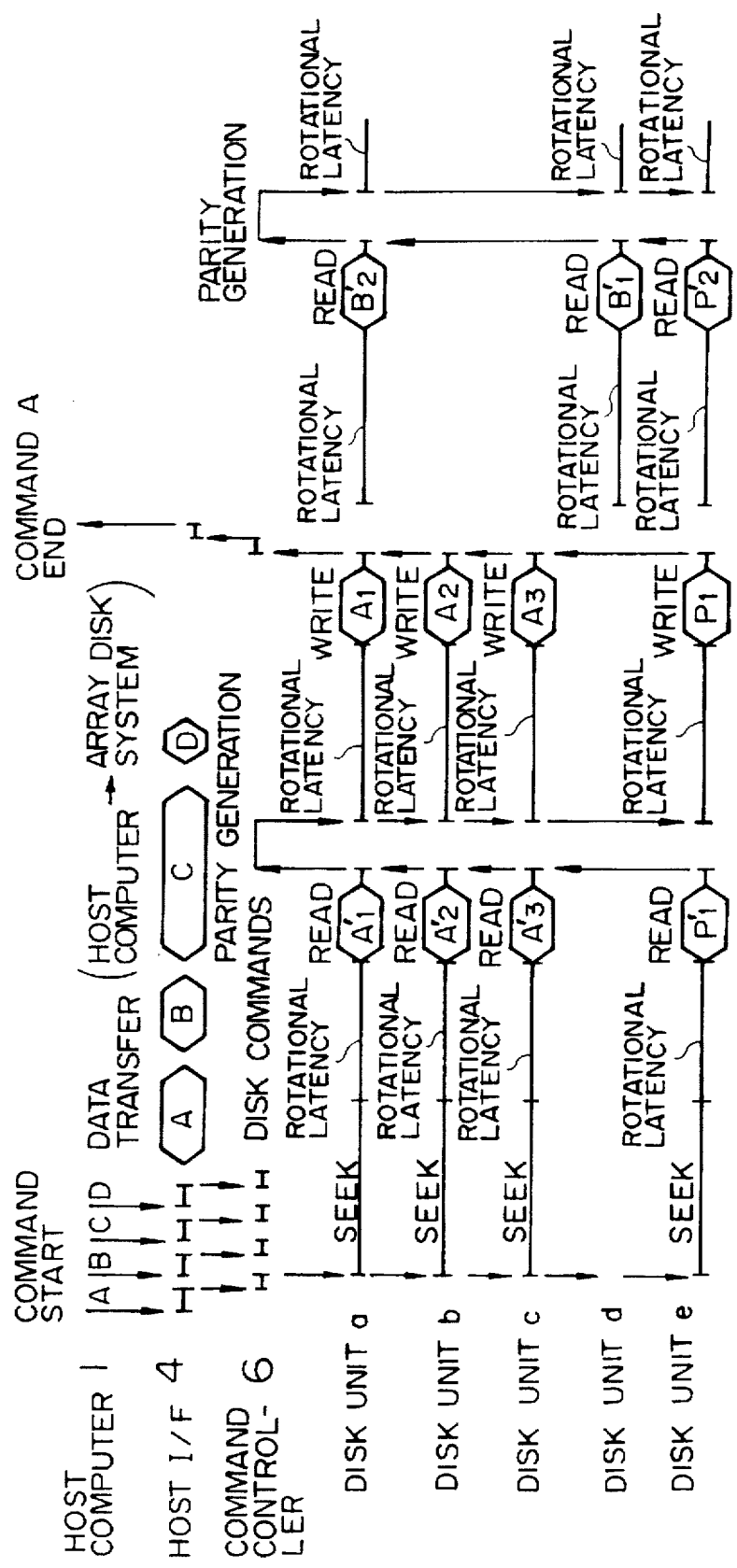
FIG. 12 is a timing chart showing an example of multiple write operations according to the prior art.

A conventional system will be explained below for comparison by reference to FIG. 12.

A host computer 1 issues a write demand for continuous data as host commands A, B, C and D. These commands are received and interpreted by command controller 6 of an array disk controller 3 as in the read operation, and are converted into disk commands sequentially to energize the disk units. This write operation is different from the read operation in that in write mode, the old data written in the disks are read out, and a new parity data is required to be generated by taking the exclusive OR of these data and new data to be written.

Specifically, the old parity stripe P1' and the old data A1', A2' and A3' of the stripes A1, A2 and A3 respectively corresponding to the host command A are read, followed by taking the exclusive OR of these old data and the new data stripes A1, A2 and A3, so that the new parity data stripe P1 is generated by use of these data and the old parity stripe P1'. After a rotational delay of one disk rotation, the new data stripes A1, A2 and A3 and the new parity data stripe P1 are written thereby to complete a series of write operations. The same operations are performed also for the host commands B, C and D.

According to this embodiment, the processing speed is reduced by the interposition of a rotational delay time between the read and write operations for parity generation and also between execution of host commands as in the read operation.

Figure 13:
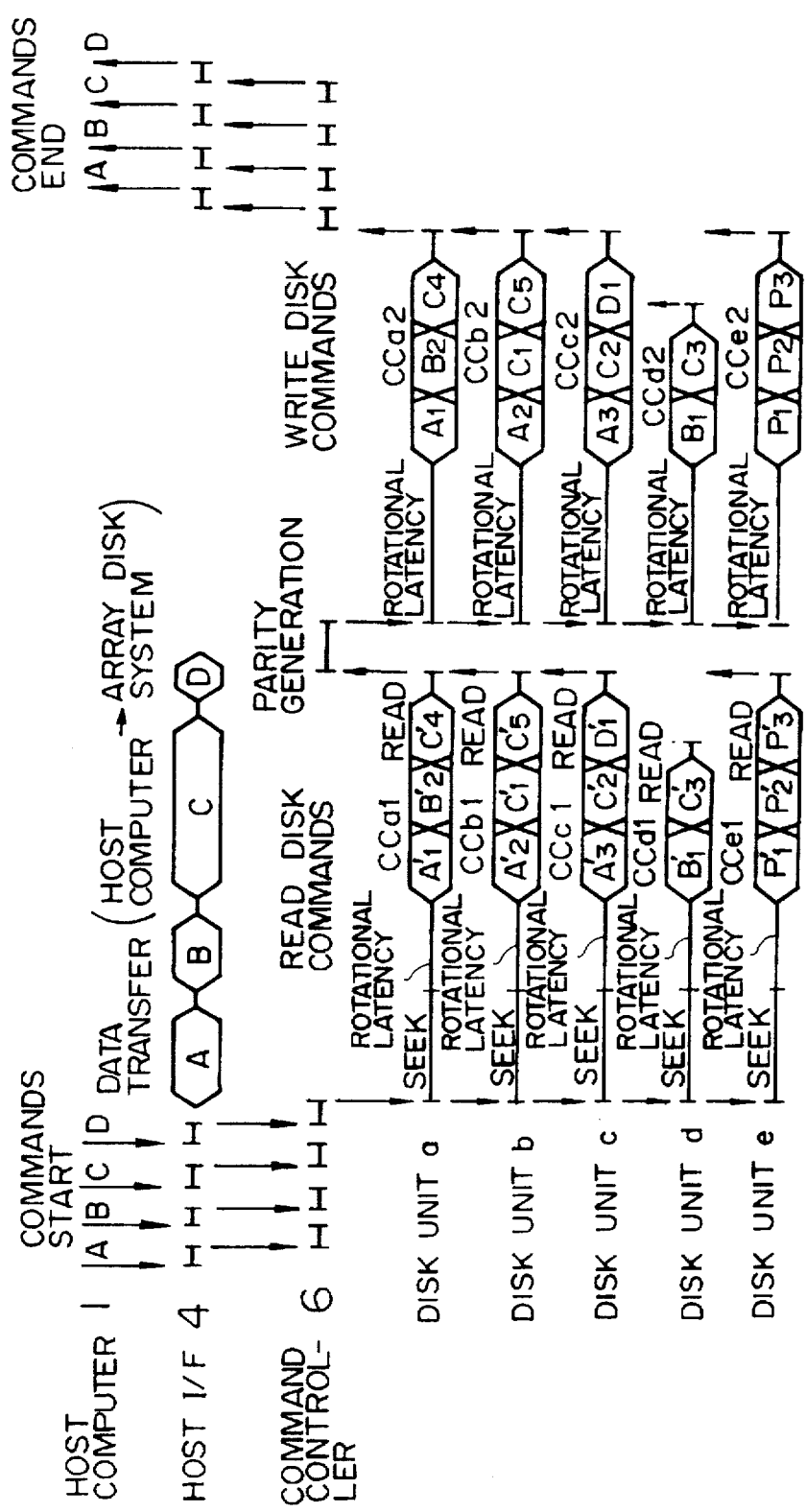
FIG. 13 is a timing chart showing an example of multiple write operations according to the first embodiment shown in FIG. 6.

Now, explanation will be made about a first write system according to the present invention with reference to FIG. 13.

As in read mode, command controller 6, upon receipt of host commands A, B, C and D from a host computer 1, interprets them, and if it judges that the host commands make up sequential accesses to continuous areas, groups (clusters) them temporarily by command clustering means 14 in the command controller 6. As shown in FIG. 8, these commands give the appearance of a single host command and are converted into disk commands, while at the same time generating and issuing read disk commands CCa1, CCb1, CCc1, CCd1 and CCe1 to the disk units a to d. The disk command CCa1 is for reading the old data stripes A1', B2' and C4' of the disk unit a, the disk command CCb1 for reading the old data stripes A2', C1' and C5' of the disk unit b, the disk command CCc1 for reading the old data stripes A3', C2' and D1' of the disk unit c, the disk command CCd1 for reading the old data stripes B1' and C3' of the disk unit d, and the disk command CCe1 for reading the old parity data P1', P2' and P3' of the disk unit e. The respective object data are read from the disk units a to e after seek and rotational latency time. New parity data P1, P2 and P3 are prepared from these old data, the new data A1, A2, A3, B1, B2, C1, C2, C3, C4, C5 and D1 and the old parity data P1', P2' and P3'. After that, the new data A1 to D1 and the new parity data P1 to P3 are written by the same method as in read operation by using the disk commands CCa1 to CCa2 similar to the read disk commands CCa1, CCb1, CCc1, CCd1 and CCe1 as write disk commands. The write operation is thus completed.

In the process, if the parity data generation time is sufficiently small as compared with the rotational delay time of one rotation of the disk, the rotational delay time can be reduced by a maximum of (2n−2) rotations as compared with the conventional systems, in view of the fact that there is only one rotational delay between read and write operations. A very great advantage of an improved speed is thus attained.

Figure 14:
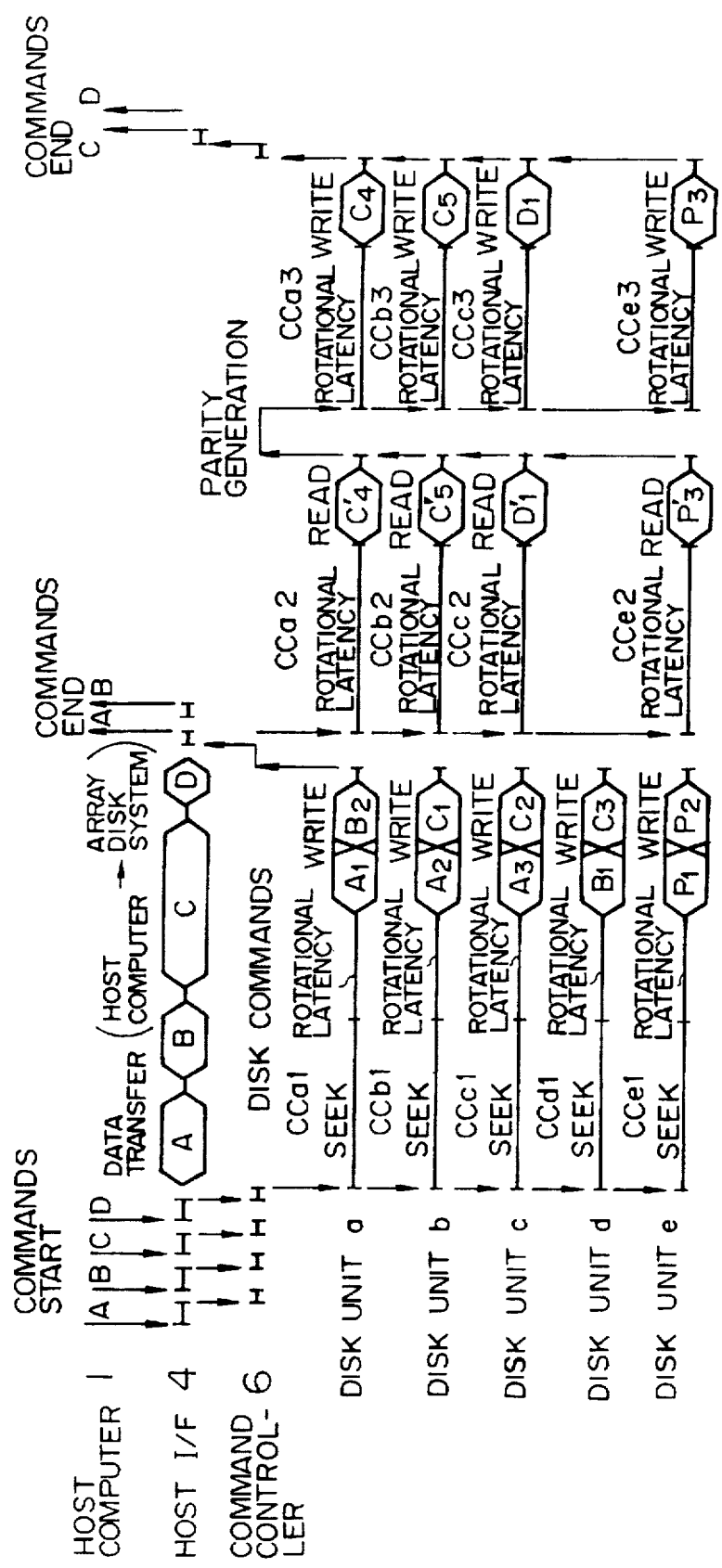
FIG. 14 is a timing chart showing another example of multiple write operations according to the first embodiment shown in FIG. 6.

Now, explanation will be made about a second write system according to the present embodiment, for which the idea shown in FIG. 14 is introduced.

More specifically, when host commands are mapped in logical addresses as shown in FIG. 9, all the data stripes of a parity group are written for the upper (head) two rows, and therefore parity data can be prepared without reading the old data. As a result, as far as these two rows are concerned, as shown in FIG. 14, the data may be written without being read at all the data units a, b, c and d and the parity disk unit e (disk commands CCa1 to CCe1).

In the third row from the top in FIG. 9, on the other hand, the old data C4', C5' and D1' and the old parity data P3' are read by the disk commands CCa2, CCb2, CCc2 and CCe2, and after generating a parity by means of these commands and new data, new data are written by the write disk commands CCa3, CCb3, CCc3 and CCe3.

According to this second method, as compared with the aforementioned first method, the rotational latency time is increased by one to three rotations. In the case where a data transfer time sufficiently long as compared with the rotational latency time is required, however, the read operation time for parity generation is so short that a processing speed sufficiently higher than in the first method is obtained. Also, the rotational latency time can be reduced by (2n−5) rotations as compared with the prior art methods.

The effects of the second method in write operation will be specifically explained as in the case of read operation.

Assume that a write access demand divided into four 16-Kbyte commands is issued to 64-Kbyte continuous areas from a host computer 1, and that the data on each 16-Kbyte command is distributed uniformly among four disk units for write operation. It is also assumed that the stripe size is 4 Kbytes and the overhead time such as command interpretation is negligibly small.

According to the conventional methods, the processing time T" is given as shown below in the worst case of writing after every reading operation.

$T=$(Average seek time+Average rotational latency time)+(16-Kbyte data transfer time÷4)×4×2+(Rotational latency time for a rotation)×(Total number of accesses−1)=145.7 (milliseconds)

According to the first method of the present embodiment, by contrast, the processing time T1 is $T1=$(Average seek time+Average rotational latency time)+(64-Kbyte data transfer time÷4)×2+(Rotational latency time for one rotation)=49.6 (milliseconds)

It will be seen that the processing speed according to the present embodiment is about three times higher than in the prior art.

When an access demand is issued from the host computer 1 to 4-Mbyte continuous areas by being divided into four 1-Mbyte commands, the processing time T" according to the prior art, assuming that the write operation is required after each reading operation in the worst case, is given as $T=$(Average seek time+Average rotational latency time)+(1-Mbyte data transfer time÷4)×4×2+(Rotational latency time for one rotation)×(Total number of accesses−1)=802 milliseconds In the first method according to the present embodiment, on the other hand, the processing time T1 is given as $T1=$(Average seek time+Average rotational latency time)+(4-Mbyte data transfer time÷4)×2+(Rotational latency time for one rotation)=706 milliseconds In this case, the processing speed according to the present embodiment is increased by only about 1.1 times.

According to the second method of the present embodiment, by contrast, the processing time T2 is expressed as shown below, assuming that five rotational delays occur in the worst case and that the area for writing after reading operation is 16 Kbytes.

T2=(Average seek time+Average rotational latency time)+(Transfer time of data (4 Mbytes–16 Kbytes)÷4)+(16-Kbyte data transfer time)×2+(Rotational latency time for one rotation)×4=438 milliseconds This shows so great an advantage that the processing is improved by at least about two times as compared with the conventional methods.

Figure 2:
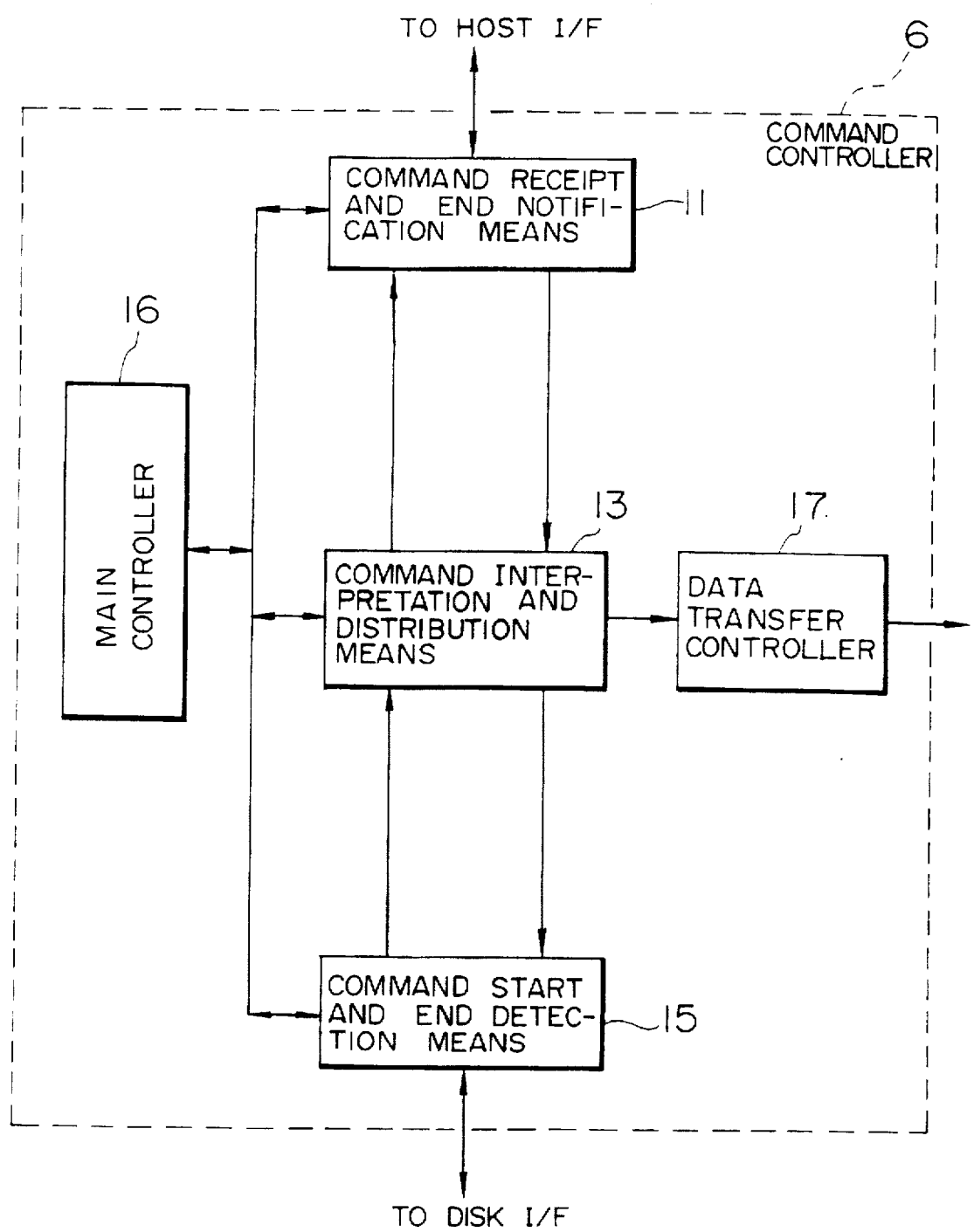
FIG. 2 is a block diagram showing an example of a conventional array disk controller.
Figure 3:
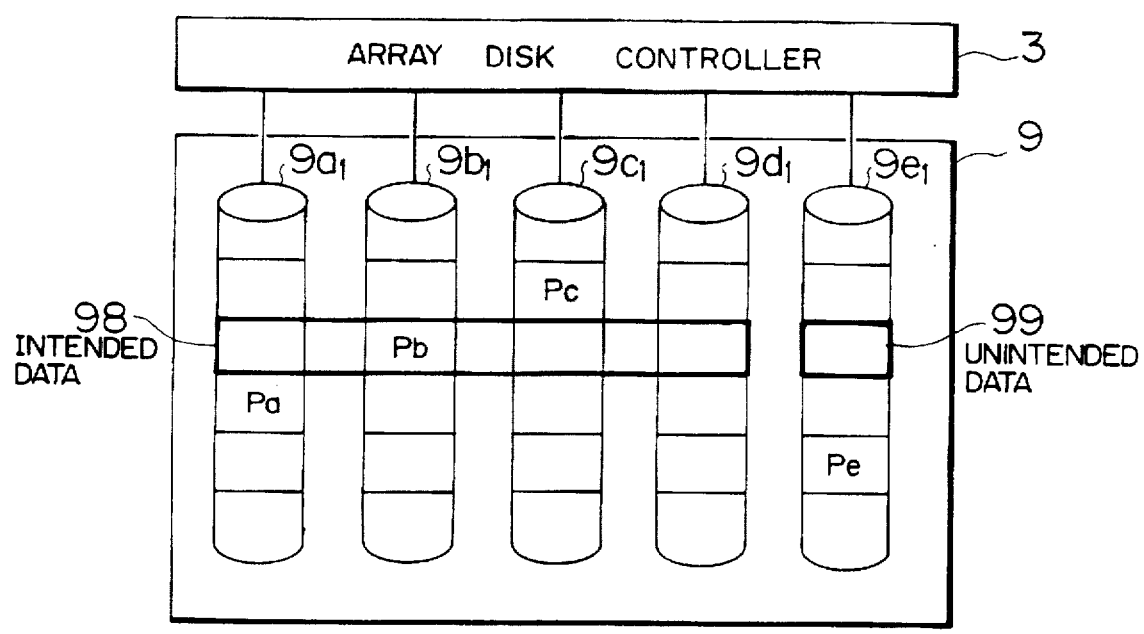
FIG. 3 schematically shows an example of distribution of intended access data for an array disk system.
Figure 4:
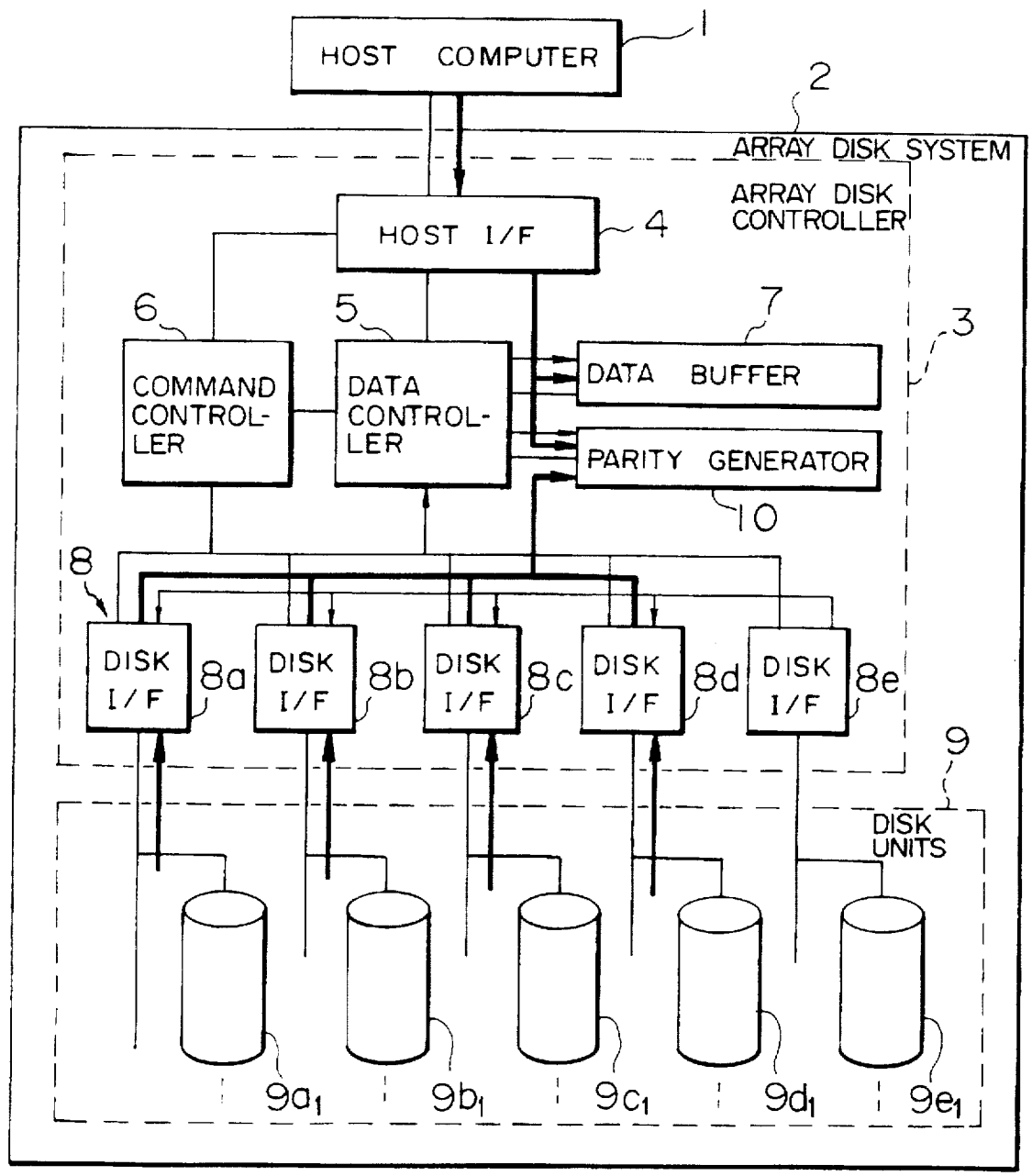
FIG. 4 is a block diagram for explaining the data flow for reading data in the RMW processing.
Figure 5:
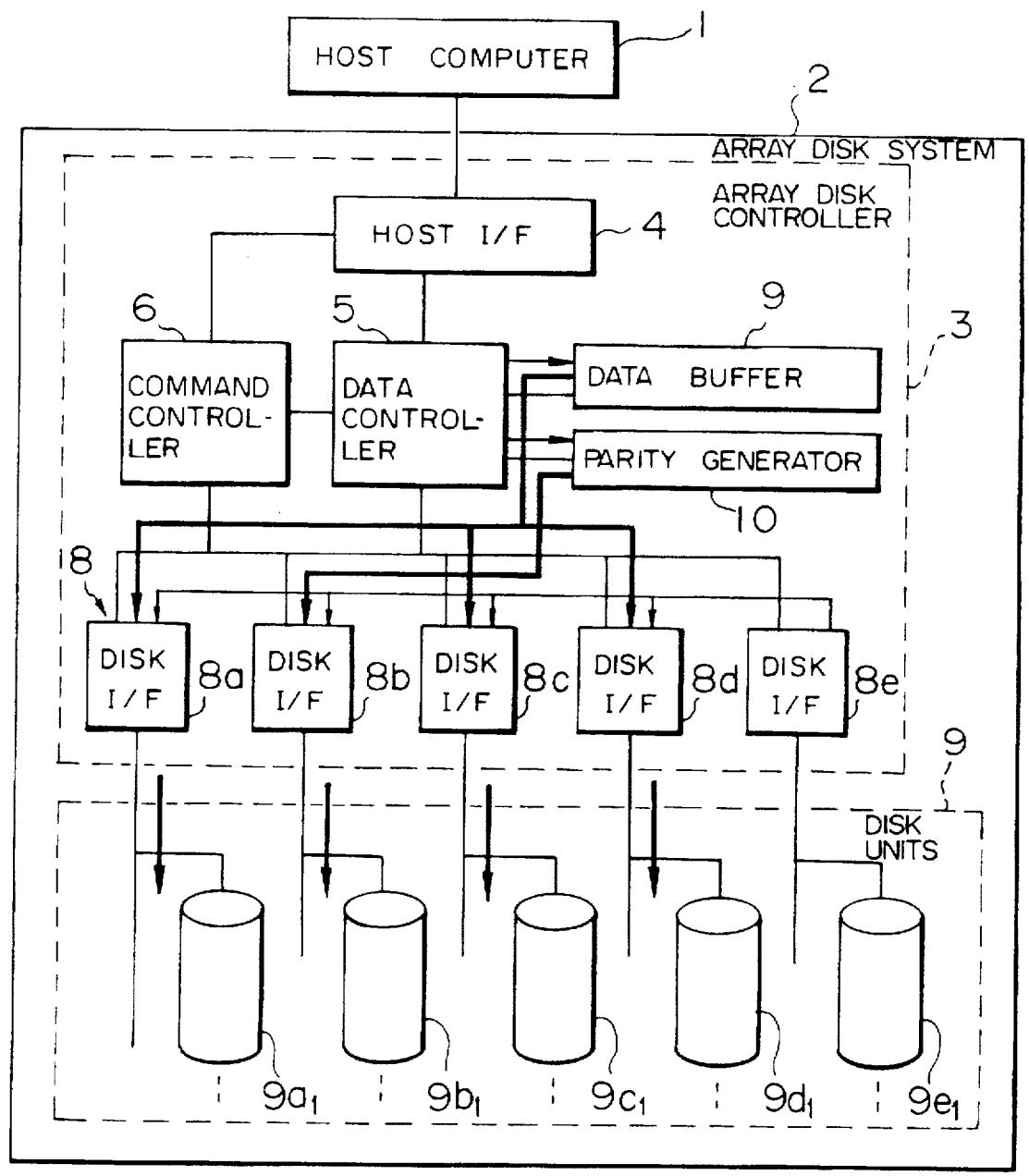
FIG. 5 is a block diagram for explaining the data flow for writing data in the RMW processing shown in FIG. 4.

Once the read or write operation is finished and data are written into or read out of the disk units 9a to 9e, the disk units 9a to 9e in FIG. 1 notify the fact to the disk command start/end means 15 of the command controller 6 shown in FIG. 6 through disks I/F 8a to 8e, and the disk command start/end means 15 in turn notifies the fact to command clustering means 14. When this operation is reading, the data transfer timing means 17 couples and transfers sequentially to the host computer 1 (FIG. 2) the data corresponding to the preceding host command stored in the data buffer 7 (FIG. 1) as described above. The command clustering means 14 deletes the management information associated with the commands from the disk command management table 18, and at the same time notifies the fact to the host command queuing means 12. Thus the corresponding host command is caused to be deleted from the command queue while at the same time notifying the host command input/output means 11. Upon receipt of this notification, the host command input/output means 11 notifies the end of a command to the host computer 1 through the host I/F 4, thereby finishing a series of processes.

The effects of the present embodiment are summarized below.

(1) Rotational latency is reduced by a maximum of (n–1) rotations. As a result, when 64-Kbyte data is read with a 16-Kbit host command issued four times sequentially, for example, the total processing time is reduced by about three times as compared with the conventional systems.

(2) When a small data is sequentially written, the rotational latency is reduced by a maximum of (2n–2) rotations according to the first method mentioned above. As a consequence, when writing a 64-Kbyte data with a 16-Kbyte host command issued four times sequentially, for example, the total processing time is saved by about three times as compared with the conventional systems.

(3) When a large data is written sequentially, the rotational latency time is reduced by a maximum of (2n–5) according to the second method mentioned above. Further, the reading of the old data for most parity generation is eliminated. As a result, when a 4-Mbyte data comprised of four 1-Mbyte host commands sequentially issued is to be written, for example, the total processing time is reduced by about two times even in the worst case as compared with the prior art.

Figure 15:
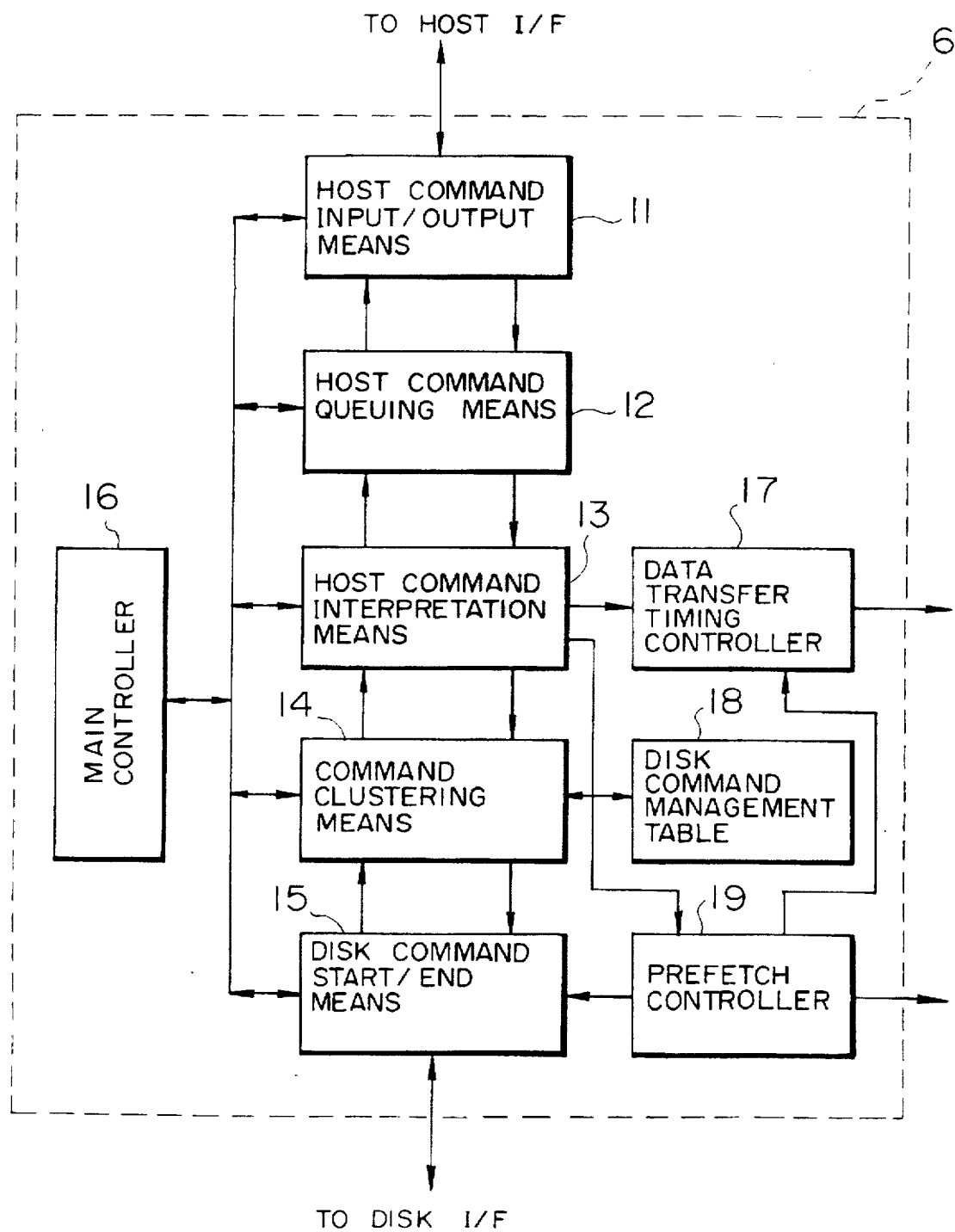
FIG. 15 is a block diagram showing a second embodiment of an array disk controller according to the present invention.

FIG. 15 is a block diagram showing an internal configuration of the command controller 6 of the array disk system 2 shown in FIG. 1 using an array disk controller according to the present invention. Prefetch controller 19 is installed in the command controller 6 shown in FIG. 6. The command clustering means 14 and the host command queuing means 12 explained with reference to FIG. 6 are assumed to be lacking in the description that follows, although they may be used with equal effect in the system under consideration as shown in FIG. 15.

In FIG. 15, the prefetch controller 19 judges whether the prefetch described later has hit or not, and if it has hit, controls the system in such a manner that the data is read from a prefetch buffer mentioned below. The other component parts are identical to those included in the command controller 6 shown in FIG. 6.

Figure 16:
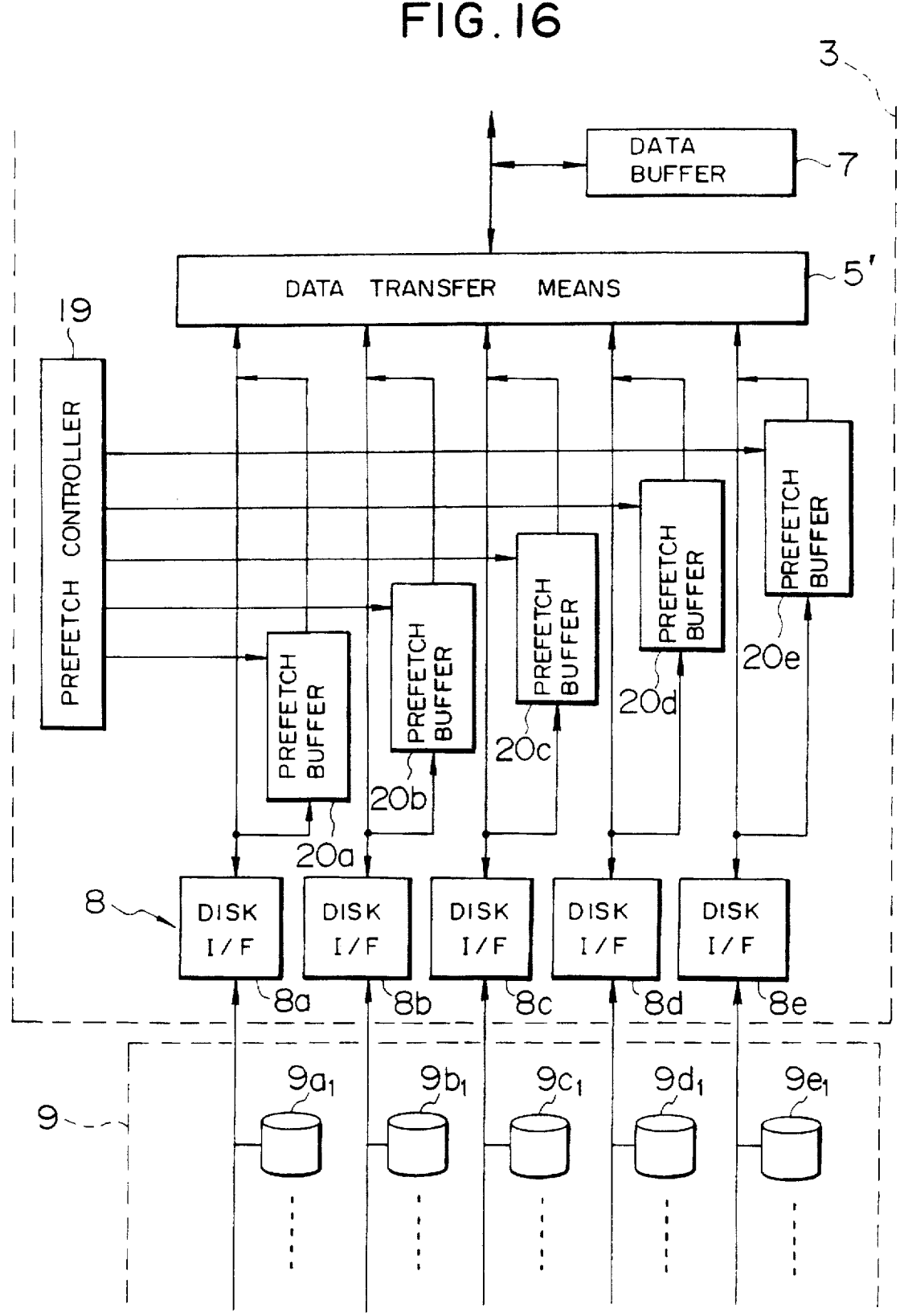
FIG. 16 is a block diagram showing an arrangement of prefetch buffers in an array disk system according to the second embodiment shown in FIG. 15.

FIG. 16 is a block diagram showing the essential parts of the array disk system shown in FIG. 1 using the command controller 6 in FIG. 15. Numeral 5' designates data transfer means, numeral 19 prefetch controller in the command controller 6 shown in FIG. 15, and numerals 20a to 20e prefetch buffers for inputting and storing the data stored on the disk units 9a, 9b, . . . in response to a command from the prefetch controller 19. The component parts in FIG. 16 corresponding to those in FIG. 1 are designated by the same reference numerals respectively as in FIG. 1.

Now, the operation of this embodiment will be explained. Consider when the host computer 1 reads the data in the continuous areas on the logical address map of the array disk system 2 in response to a plurality of host commands issued several times. In a plurality of sequential accesses such as this, the situation is similar to the first embodiment described above. In such a case, assuming that one disk unit is connected to the host computer and that a particular data is stored in an advance read data storage area called the prefetch buffer of the particular disk unit, then there develops no delay depending on the mechanism of the disk unit including the seek or rotational delay by reading the data from that storage area. Also, the fact that data is read from an electrical storage area such as memory makes very high-speed access possible. As a result, when a read demand is issued from a host computer, a prefetch control is performed in a disk unit whereby not only the related data but also the data following it are read in advance and stored in a prefetch buffer.

In view of the fact that the array disk system 2 has a plurality of disk units arranged in parallel on each row for recording data in different disk units for different stripes, however, the data are not continuous on a logical address of each disk unit even though logical addresses as viewed from the host may be continuous. Therefore, the prefetch function of the disk unit is not expected to work other than for a data access larger than the data size of the parity group. The second embodiment under consideration makes possible a high-speed technique compensating for the disadvantages of such an array disk system.

Now, the operation of this embodiment will be explained.

Figure 17:
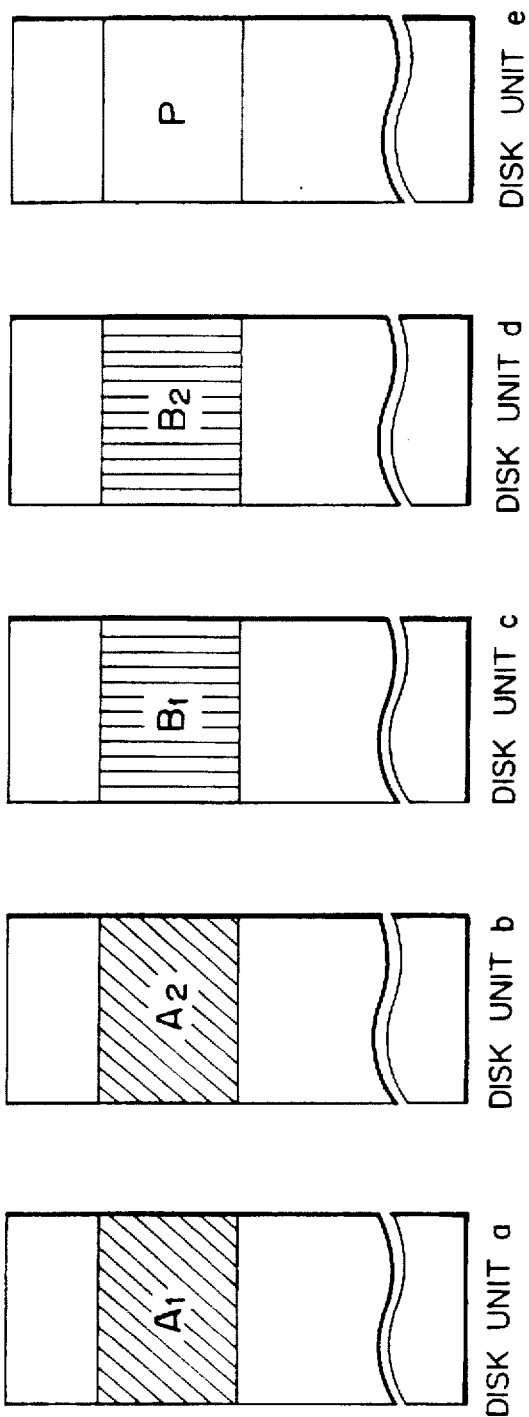
FIG. 17 is a diagram showing a logical address map of each disk unit according to the second embodiment shown in FIG. 15.

As an example, assume that two sequential access demands A and B are issued from the host computer 1. As shown in FIG. 17, characters A1, A2 designate stripes of the disk units a, b accessed by the host command A, characters B1, B2 stripes of the disk units c, d accessed by the host command B, and character P a parity stripe of the disk unit e of a parity group including A1, A2 and B1, B2.

Figure 18:
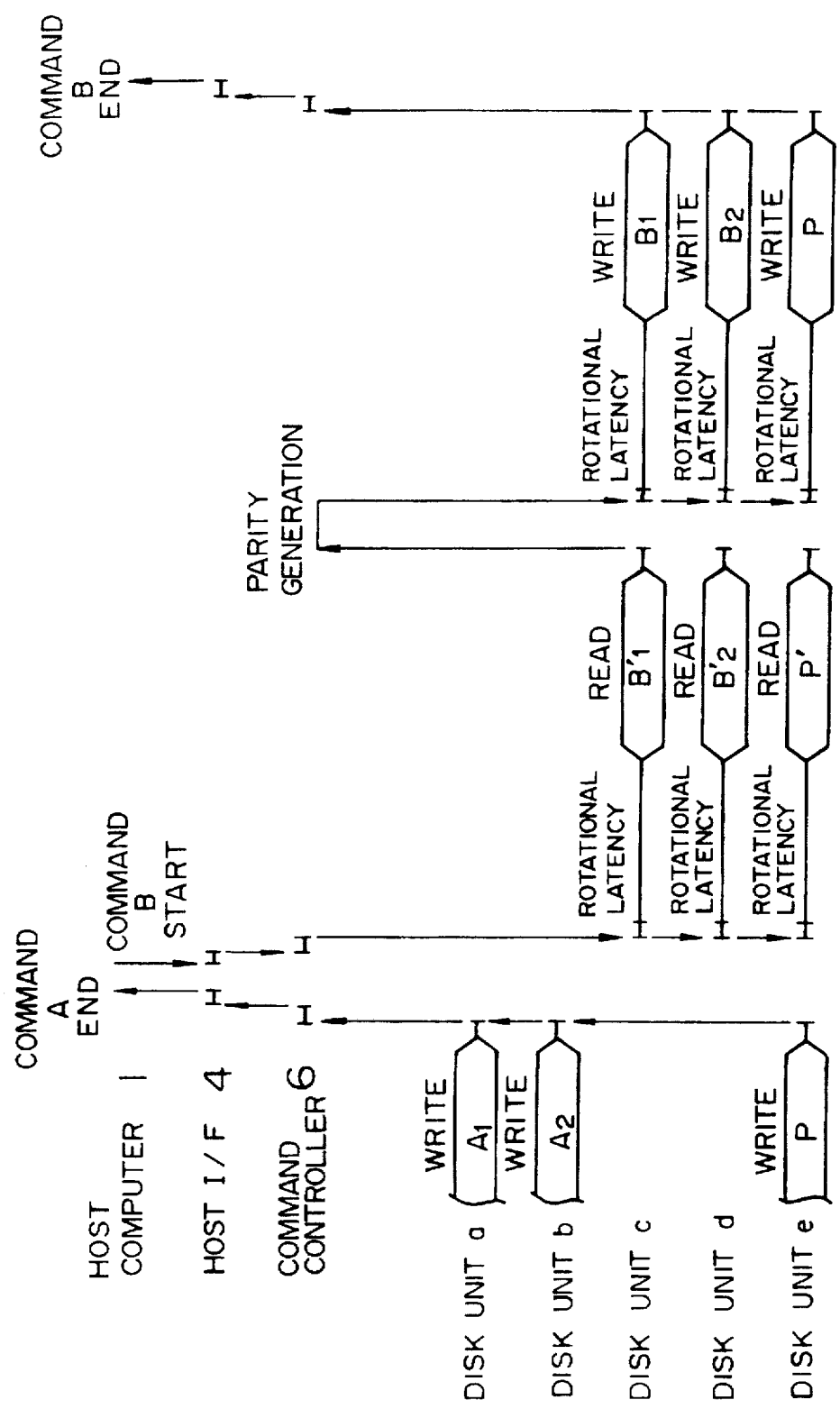
FIG. 18 is a timing chart showing the write operation according to the prior art.

First, reference is made to the write operation. For comparison, a conventional system will be explained with reference to FIG. 18.

A host command A is executed first of all. Specifically, the old data A1', A2' and old parity data P' are read from the disk units a, b and e. A new parity data P is generated by calculating the exclusive OR of these data and a new data. The new data A1, A2 are written into the disk units a, b, and the new parity data P into the disk unit e. The end of a command is reported to the host computer 1 thereby to end the host command A. The host command B is similarly executed, with the end thereof reported to the host computer 1, thus completing the two sequential write commands.

The operation of the write operation according to the method of the present embodiment will be explained with reference to FIGS. 1, 15, 16 and 19.

First, when the host command A is supplied to the command controller 6, the host command interpretation means 13 judges that an access demand is received for the disk units 9a, 9b and 9e, and generates disk commands for the disk units 9a, 9b and 9e and sends them out to the disk command start/end means 15. The disk command start/end means 15 thus activates these disk commands.

At the same time, the host command interpretation means 13 judges that the disk units 9c and 9d are not busy and notifies the fact to the prefetch controller 19. The prefetch controller 19, upon receipt of this notification, generates a disk command to read the data in the logical address area following the access area of the host command A of the disk units 9c, 9d, and sends it to the disk command start/end means 15. Also, the prefetch controller 19 has stored therein the fact that a read demand has been sent to the disk units 9c and 9d. The disk command start/end means 15 thus issues a read disk command to the disk units 9c and 9d.

The host command A reads, as in the prior art, the old data A1', A2' and P' from the disk units a, b and e, and by taking the exclusive OR of them and a new data, generates a new parity data P, which is written into the disk units 9a, 9b and 9e together with the new data A1 and A2 and is reported to the host computer 1. All the processes for the host command A are thus completed.

At the same time, the read disk command to the disk units 9c and 9d generated from the host command B at the prefetch controller 19 is executed, from which the old data B1' and B2' are transferred. The prefetch controller 19 sets the prefetch buffers 20c and 20d ready for data input and stores therein the old data B1' and B2' thus read. In the meantime, the old data B1' and B2' are not transferred to the data transfer means 5 and the data buffer 7. Upon complete transfer of the old data to the prefetch buffers 20c and 20d, the prefetch controller 19 records the particular state in the internal storage area thereof. The prefetch controller 19 also controls the write data A1, A2 and P to the disk units 9a and 9b in such a manner as to be stored in the prefetch buffers 20a, 20b and 20e respectively while at the same time being transferred from the data buffer 7 to the disk units 9a, 9b and 9e.

The above-mentioned operation of reading and storing in a prefetch buffer the data area following the present access area and storing the write data to the disk unit in a prefetch buffer will hereinafter be referred to as "the data prefetch".

When the host computer 1 receives the completion report of the host command A, the next host command B is issued to the array disk system 2. The command controller 6, upon receipt of the next host command B, has the host command interpretation means 13 interpret the host command B and generates a disk command for the disk units 9c, 9d and 9e and sends it to the disk command start/end means 15.

One the other hand, the host command interpretation means 13 judges that the access under consideration is the one to the disk units 9c, 9d and 9e and also that the disk units 9a and 9b are not busy, and notifies the fact to the prefetch controller 19. The prefetch controller 19 judges whether the old data B1', B2' and P' used for parity generation for the present write operation are stored in the prefetch buffers 20c, 20d and 20e (which is called "the prefetch hit judgment"). The fact that the old data are already prefetched at the prefetch buffers 20c, 20d and 20e in the case under consideration is notified to the disk command start/end means 15 and the data transfer timing controller 17 as a prefetch hit.

The disk command start/end means 15 thus judges that the reading operation to the disk units 9c, 9d and 9e is not required, and issues a write disk command to the disk units 9c, 9d and 9e at appropriate timing. The data transfer timing controller 17 causes the data transfer means 5 to transfer the old data B1', B2' and P' stored in the prefetch buffers 20c, 20d and 20e and the new data B1 and B2 stored in the data buffer 7 to the parity generator 10 (FIG. 1) thereby to generate a new parity P.

After complete generation of the new parity P, the command controller 6 receives a completion notice, issues a write disk command to the disk units 9c, 9d and 9e, and writes the data B1, B2 and parity P into the disk units 9c, 9d and 9e. Upon completion of the write operation and reporting thereof to the host computer 1, the write operation is completed.

Figure 19:
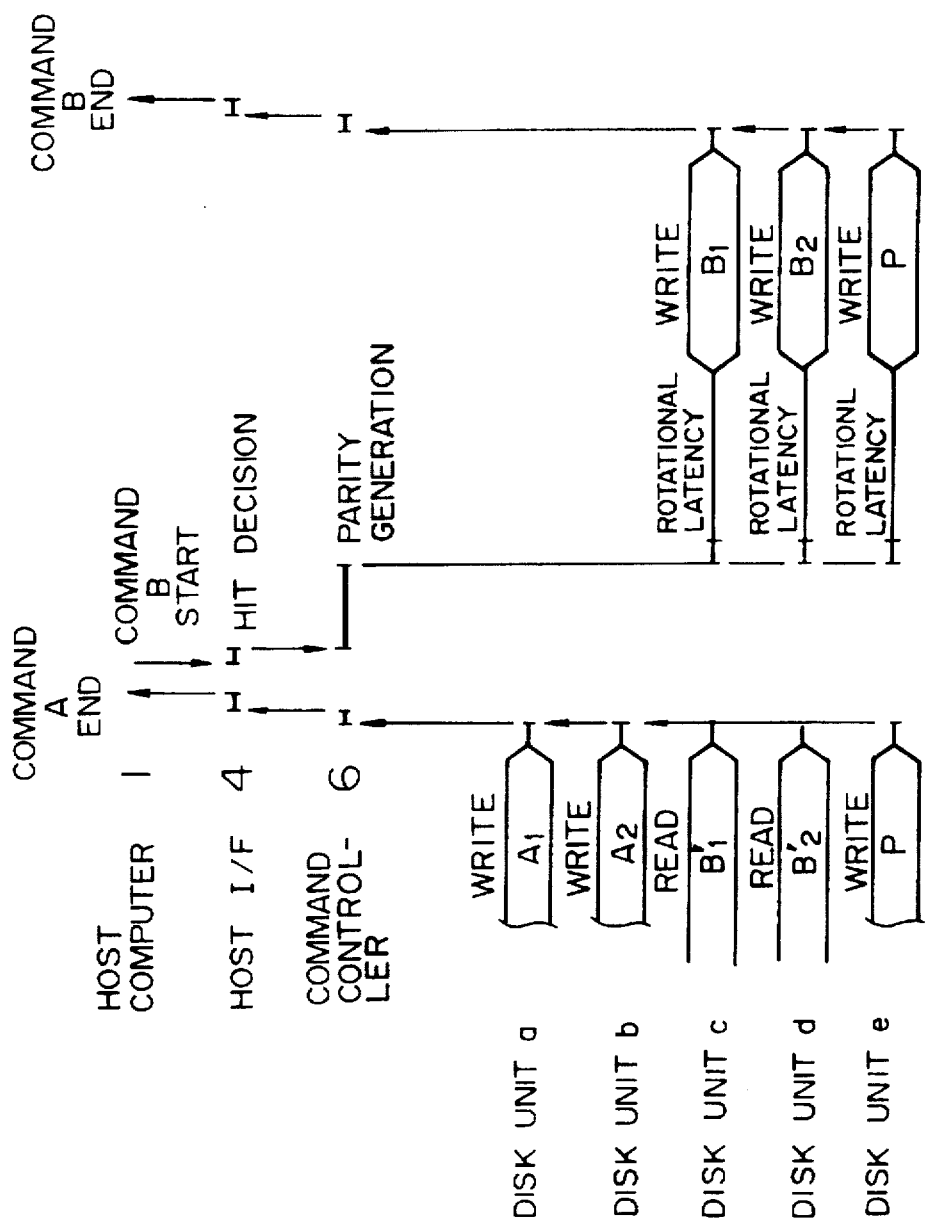
FIG. 19 is a timing chart showing the write operation according to a second embodiment shown in FIG. 15.

The above-mentioned process is shown in FIG. 19.

The disk units 9a and 9b are not executed during the write operation in the disk units 9c, 9d and 9e. The prefetch controller 19, therefore, generates a read disk command to read the next continuous data at the prefetch buffers 20a and 20b, and issues the read disk command to the disk command start/end means 15 in preparation for the next sequential access. Further, the data written for the present time is stored in the prefetch buffers 20c, 20d and 20e.

As described above, when a prefetch hits, the read operation for parity generation is eliminated in the write process, thereby increasing the processing speed to a level twice that of the conventional systems.

Apart from the write operation described above, a similar operation can of course be performed for a sequential read operation. In such a case, as far as all the data are stored in a prefetch buffer, the data read operation can be executed without making access to any disk units. It is therefore possible to realize a very high-speed access without seek and rotational latency time.

A prefetch read is conducted while expecting the next continuous access during the execution of a command. The read command start/end means 15 is preferably configured to suspend the prefetch operation immediately when another access is made to the same disk unit during the particular prefetch read operation. The data prefetched in such a case is invalidated, and the access demanded by the host computer 1 is immediately executed (this is called "the prefetch abort").

The prefetch buffer 20, which is interposed between the data transfer means 5' and the disk I/F 8 as shown in FIG. 16 according to the present embodiment, may alternatively be installed logically on the data buffer 7.

Figure 20:
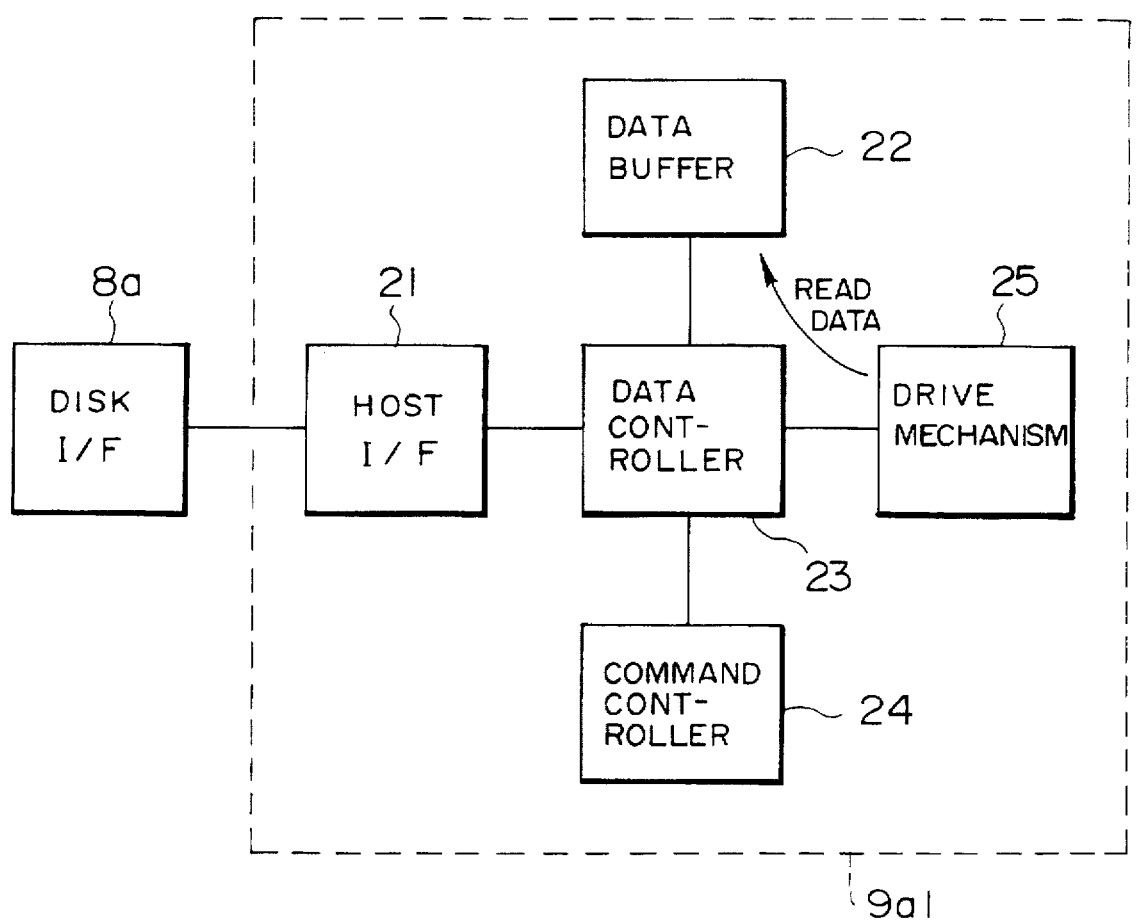
FIG. 20 is a block diagram showing an example of internal structure of a disk unit according to the second embodiment shown in FIG. 15.

Further, the prefetch buffer 20 may be installed within each disk unit instead of on the array disk controller 3. FIG. 20 is a block diagram showing a specific configuration of the disk unit 9a1 in such a case. Numeral 21 designates a host I/F, numeral 22 a data buffer, numeral 23 a data controller, numeral 24 a command controller and numeral 25 a drive mechanism.

Instead of using the data buffer 22, a prefetch buffer may be installed in the disk unit 9 separately from the data buffer 22.

As explained above, the prefetch controller 19 (FIG. 15) generates a prefetch read command, and the disk command start/end means 15 issues a read command to the disk unit 9 through the host I/F 8. This read command is received by the host I/F 21 (FIG. 20) and is interpreted by the command controller 24, so that a corresponding data is read from the drive mechanism 25 by the data controller 23 and is stored in the data buffer 22. In the process, the data controller 23 reads the same data from the data buffer 22, and transfers it to the array disk controller 3 (FIG. 1) through the host I/F 21 and the disk I/F 8. The data controller 5 of the array disk controller 3 thus neglects this data.

The above-mentioned operation permits data to be prefetched at the data buffer 22 in the disk unit 9. For a next access to this data, the same prefetch hits and it becomes possible to read the data from the disk unit 9 without any seek operation or rotational latency time.

In the above-mentioned case, the disk unit 9 is accessed once, which causes some overhead time in the disk I/F 8. As a result, the present system is somewhat deteriorated in speed as compared with the system having a prefetch buffer in the array disk controller 3. In spite of this, the present system is sufficiently higher in speed than the conventional systems due to the lack of seek and rotational latency time. Further, the elimination of a prefetch buffer realizes a low-cost system as compared with the conventional system having a prefetch buffer in the array disk controller 3 described above. Furthermore, a complicated prefetch processing in the array disk controller 3 is not required, thereby simplifying the control operation.

In FIG. 20, the system for neglecting the read data may be replaced by a new setting of a prefetch command with equal effect. When the disk command start/end means 15 sends a prefetch command to the disk unit 9, the command controller 24 judges the command and transfers the required data to the data buffer 22 by means of the data controller 23, thus completing the process. The setting of a command as described above saves the unnecessary data transfer, whereby traffic is decreased between the disk I/F 8 and the host I/F 21. As a consequence, the throughput is improved of a configuration with a multiplicity of disk units connected to the same disk I/F 8.

In this way, according to the two systems provided with a prefetch buffer in the disk unit 9 as described above, the effect mentioned above is obtained. Another effect obtainable from these systems will be explained below.

Specifically, when a disk I/F 8 (such as 8a) is configured of a multiplicity of disk units connected thereto, the prefetch operation is possible for each disk unit. When a plurality of sequential access demands are issued from a plurality of host computers 1, for example, the prefetch can be made to hit against any of the sequential access demands from the host computers 1 even in multiple operation thereof, as far as the accesses are to different disk units in the same column.

The effects of the above-mentioned embodiments are summarized below.

(1) When the prefetch buffer 20 is disposed in the array disk system 2, a prefetch hit at the time of write operation eliminates the need of the reading of the old data for parity generation, thereby improving the processing speed to a level twice higher than that of the conventional systems.

(2) When the prefetch buffer 20 is installed in the array disk system 2, a prefetch hit at the time of read operation eliminates the need of access to the disk unit 9. The read operation with the transfer speed from the prefetch buffer 20 to the host computer 1 is realized, thereby attaining a very high-speed operation as compared with the conventional systems.

(3) When data is prefetched by a prefetch buffer (data buffer 22) installed in each disk unit 9 by issuing a pseudo read command from the array disk system 2, there is no need for installing a prefetch buffer in the array disk controller 3. As a result, the array disk controller 3 is easily controlled with low cost, and a prefetch operation having substantially the same performance as in (1) and (2) is realized.

(4) A prefetch command installed as a disk command permits data to be prefetched at a buffer in the disk unit. There is thus no need for data transfer between the disk unit and the array disk controller, thereby reducing the traffic of the disk I/F.

(5) In the case of (3) and (4) above where a prefetch buffer (data buffer 22) is installed in the disk unit 9 for prefetch control, a plurality of sequential data access commands are issued substantially at the same time from a plurality of host computers 1. In multiple operation of these commands, a prefetch can be made to hit against any access demand from the host computers 1, if the access demands are for accesses to different disk units.

Each component part of the embodiments described may be configured of either hardware or software means.

The command clustering control system and the sequential data prefetch control system described above as two embodiments may be embodied at the same time. By doing so, the effects of the two systems are expected at the same time, greatly contributing to an improved speed of data transfer.

Apart from the above-described array disk system in which parity information is stored in a single disk unit (parity disk), the same data control system may be used with equal effect for an array disk system for distributing and storing parity information among and in all or a plurality of disk units.

Further, the command clustering control system described above, which has been explained as an example of the array disk controller, may be applied to any of the magnetic disk controller, the magnetic tape controller, the optical disk controller, the semi-conductor disk controller or other recording/reproduction apparatuses. In such applications, a given data length can be handled, and the same effects are obtained as mentioned above in both read and write operations.

Furthermore, the above-mentioned prefetch controller is applicable to recording/reproduction apparatuses as a whole having a multiplicity of recording/reproduction media including the optical disk library unit or the magnetic tape library, and thus can attain the same effects as explained above.

Now, a third embodiment of the present invention will be explained.

Figure 21:
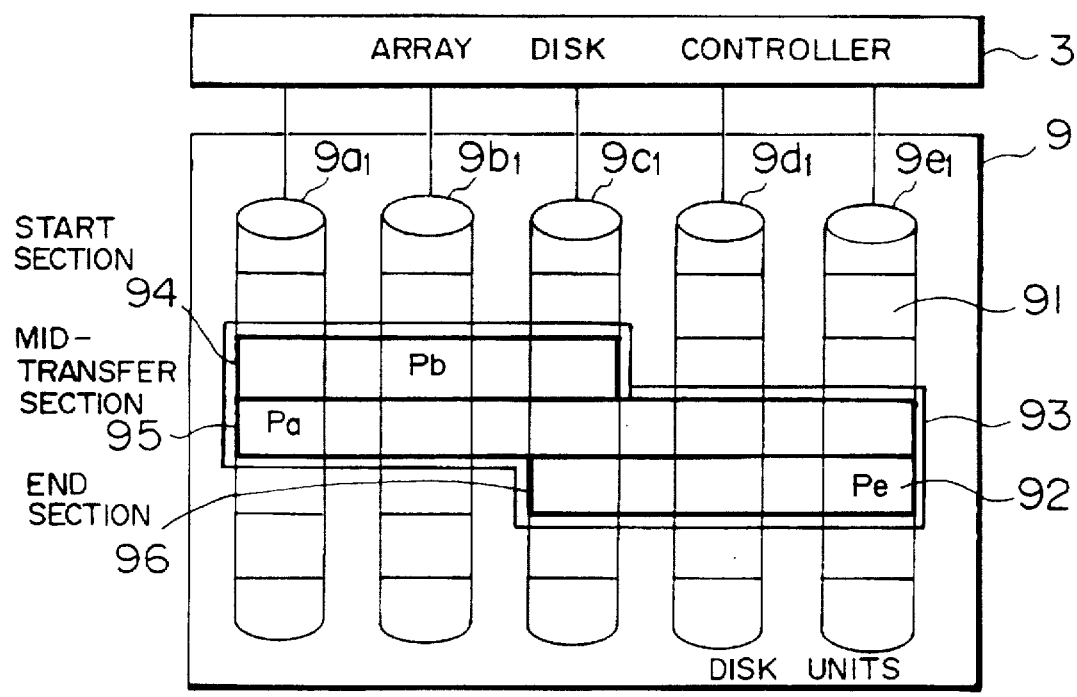
FIG. 21 is a diagram schematically showing an example of intended access data distribution in an array disk system.

FIG. 21 is a diagram showing an example of the data access area for realizing an improved processing performance according to the third embodiment. In FIG. 21, numerals 9a1 to 9e1 designate disk units, numeral 91 a access unit to a given disk unit called the striping size, numeral 92 a parity data stripe providing redundant data corresponding to all the striping data constituting a row, numeral 93 a data intended for data transfer, numeral 94 a data transfer start section for the intended data, numeral 95 a data mid-transfer section, and numeral 96 a data transfer end section. The start section and the end section where all the stripe data making up a row are not accessed by an intended data. In this case, the parity data stripes may be fixed at the same disk unit.

Figure 22:
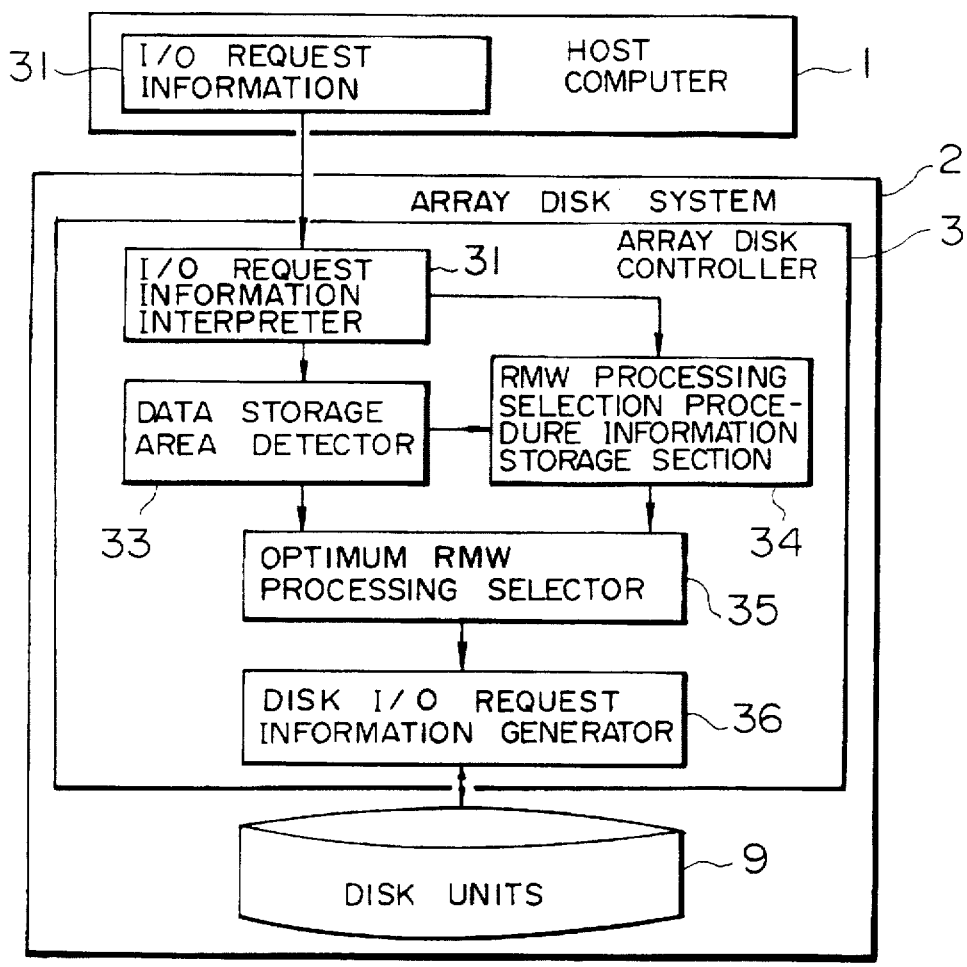
FIG. 22 is a block diagram showing a schematic configuration of a third embodiment of the present invention.

FIG. 22 is a diagram schematically showing a configuration of the third embodiment of the present invention.

In an array disk system 2, the I/O demand information 31 from a host computer 1 is transferred through a host interface 4 (FIG. 1) to an array disk controller 3. This information is interpreted at the array disk controller 3 by an I/O demand interpreter 32. The I/O demand information 31 has an I/O demand and logical address information, a transfer data length information, etc., each of which is interpreted at the same time as the I/O demand at the array disk controller 3.

The data storage area detector 33 in the array disk controller 3 detects the data storage area of each disk unit 9 making up an array disk system by means of the above-mentioned logical address information and the data transfer length information. The I/O demand is a write demand. For access to an area having a data transfer start/end section of all the storage areas of the disk units as shown in FIG. 21, the RMW processing is necessary at the data transfer start/end section.

According to the present embodiment, when an access demand requiring RMW processing is detected at a plurality of rows of the data transfer start/end section as described above, the selection procedure information is stored in advance by an RMW processing selection information generator 34 in order to select an optimum processing system from among a plurality of RMW processing systems mentioned above, and an optimum RMW processing is selected by the optimum RMW processing selector 35 by executing the selection procedure information. Further, the disk I/O demand information generator 36 of the array disk controller 3 generates the disk I/O demand information against an associated disk unit 9 on the basis of the RMW processing system selected as above. This disk I/O demand information is transferred to the disk unit 9 through the disk interface controller 8 (FIG. 1), so that the I/O processing is realized between the disk unit 9 and the array disk controller 3.

According to the present embodiment, the command controller 6 of the array disk controller 3 has a plurality of different RMW processing systems including the number of command issues to the disk unit and the command issue procedure for realizing the above-mentioned RMW processing. When the RMW processing associated with a write access demand from the host computer is required for data storage areas covering a plurality of rows, the selection procedure information is prepared in advance in order to make an optimum RMW processing system selectable in accordance with the I/O demand information from the host computer 1, and an optimum processing selected from a plurality of RMW processing systems on the basis of the selection procedure information is executed. The array disk controller 3, for example, detects the demand transfer data length from the I/O demand information supplied by the host computer 1, and generates the procedure for selecting the optimum RMW processing system from the result of comparison between the data transfer processing time required for data transfer and the interface protocol processing time. An RMW processing system suitable for the small-capacity data transfer, an RMW processing system suited to the large-capacity data transfer, etc., is selected from the selection procedure information.

The RMW processing systems available for the array disk controller 3 include the following:

(a) An RMW processing system in which the data covering a plurality of rows requiring the read access at the time of RMW processing are realized by the read access processing with independent command issue for each row. Further, the data covering a plurality of rows requiring write access are realized by the write access processing with a single write command issue for each row.

(b) An RMW processing system in which the data covering a plurality of rows requiring read access at the time of RMW processing are realized by the read processing with a single read command issue. Further, the data covering a plurality of rows requiring write access are also realized by the write access processing with a single write command.

(c) An RMW processing system in which the data covering a plurality of rows requiring read access at the time of RMW processing are realized by the read access processing with an independent read command issue for each row. Further, the data covering a plurality of rows requiring write access are realized by the write access processing with a single write command issue.

(d) An RMW processing system in which the data covering a plurality of rows requiring read access at the time of RMW processing are realized by the read access processing with read command issues not more than rows in number. Further, the data covering a plurality of rows requiring write access are realized by the write access processing with write command issues not more than rows in number.

(e) A reconstruction processing system in which an RMW processing is realized for intended data requiring an RMW processing by use of unintended data constituting the same row.

The array disk controller 3 has the function of realizing by software a selection information generator 34 including transfer data length detection means for detecting the length of the demand transfer data from the I/O demand issued by the host computer 1, RMW processing area detection means for detecting an RMW processing area and magnetic head position detection means for detecting the position of a magnetic head, and an RMW processing selector 35 for selecting an optimum processing system from among a plurality of RMW processings mentioned above in response to the detection result input thereto from the above-described various means, whereby the RMW processing is optimized. The RMW processing is further optimized by generating selection control information from a combination of a plurality of above-mentioned detection information. It is also possible to attach the order of priority to the detection information in generating selection control information from one of a plurality of detection information. Furthermore, the array disk controller 3 is adapted for detecting an RMW processing area and selecting an RMW processing system suitable for each access area distribution on the basis of the access area distribution as selection information.

Figure 24A:
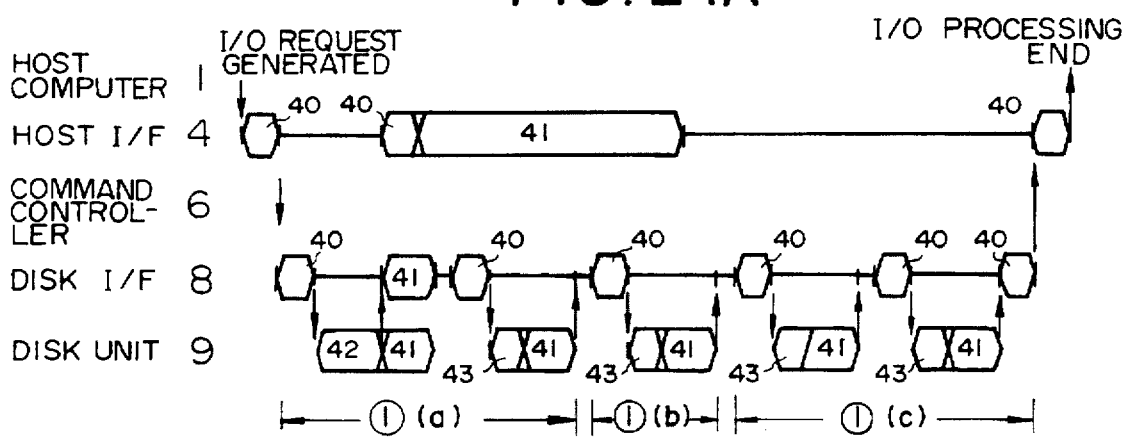
FIGS. 24A, 24B and 24C are diagrams for explaining the difference in write operation between different RMW processings under executions.
Figure 24B:
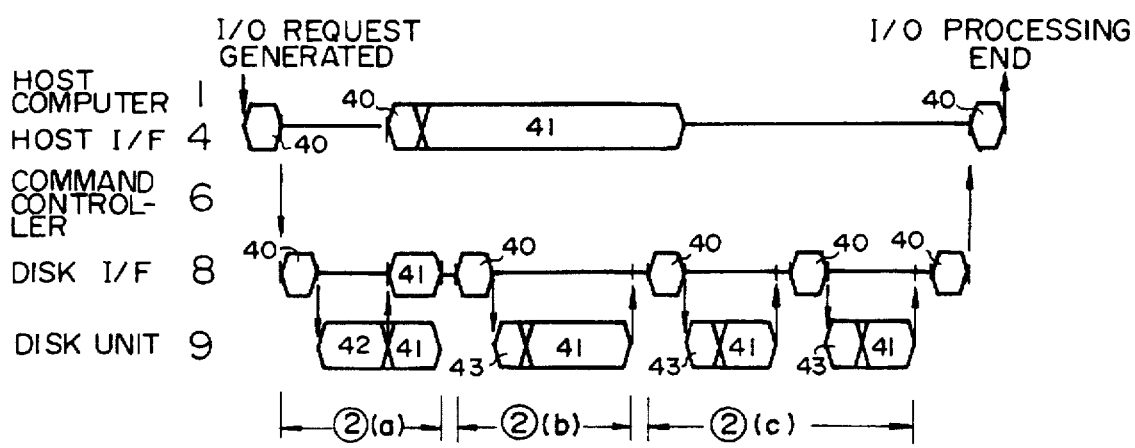

The above-mentioned processing system (a) is an RMW processing system identical to the one used in the prior art, and an example thereof is shown in FIG. 24A.

Figure 24C:
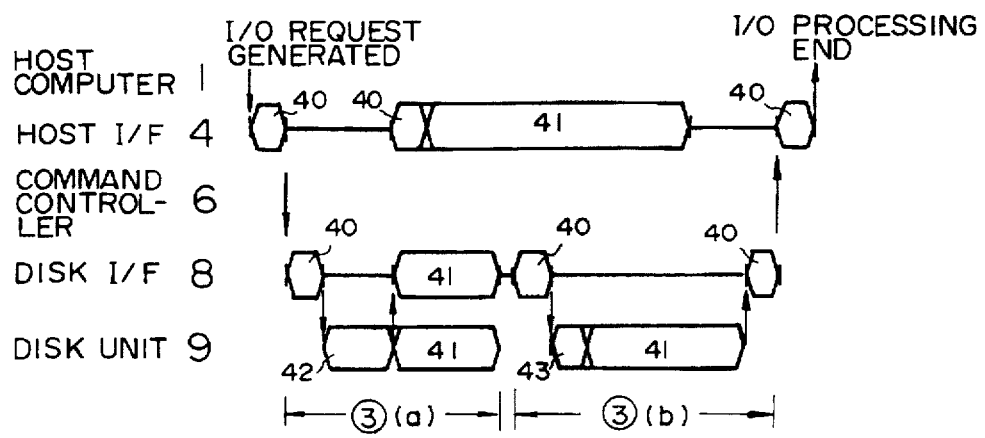

The above-mentioned processing system (b) is an RMW processing system for reducing the number of accesses, and an example thereof is shown in FIG. 24C.

One of the processing systems (c) to (e) is selected in accordance with various selection information.

Figure 23:
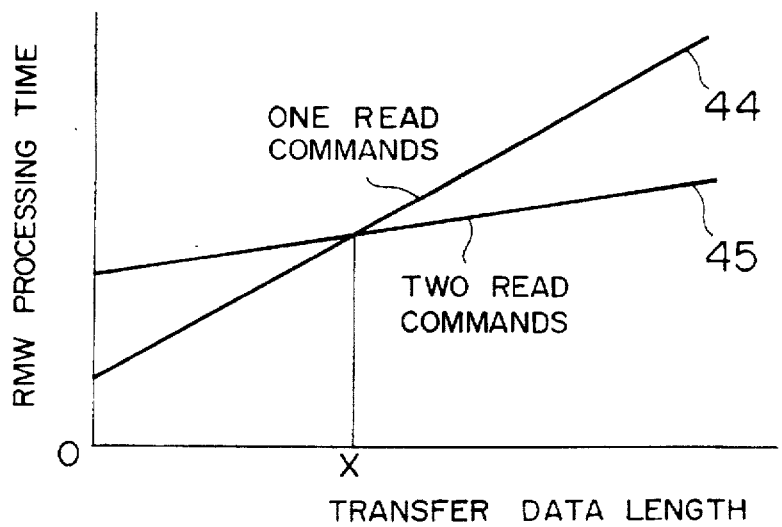
FIG. 23 is a diagram for explaining the relationship between the data transfer length and the processing time with the read access at the data transfer start/end sections executed by one and two commands respectively in the RMW processing.

Now, explanation will be made for when the transfer data length information is used as a selection condition, with reference to FIG. 23. The RMW processing execution time requiring the read access for each of the data transfer start/end sections is plotted in FIG. 23. In FIG. 23, numeral 44 designates when the data read access of the data transfer start/end sections is realized by one read command, and numeral 45 when a similar access is attained by two read commands (such as by the RMW processing system (3) mentioned above). The write operation is realized by one write command. As will be seen from FIG. 23, when the data transfer length is short, the processing time can be reduced by realizing the read operation by one command. For the data transfer length of X or more, by contrast, a shorter processing time is required when the read operation is realized by two read commands (such as by the RMW processing system (2) mentioned above) than when it is realized by one read command. This is due to the fact that the processing time required for read operation on the mid-transfer data section is longer than the interface processing time.

In the present embodiment with the data transfer length as a selection condition, the RMW processing selection control information is generated in such a manner that an RMW processing for realizing the read operation by two read commands is selected when the detected transfer data length is longer than X, while an RMW processing for realizing the read operation by one read command is a choice when the detected transfer data length is shorter than X. An RMW processing selector selects an appropriate processing system from among a plurality of RMW processing systems in response to input information including the RMW processing selection control information and the transfer data length X providing the selection condition information.

In this way, an optimum RMW processing system is selected from the data transfer length to thereby realize an improved processing performance.

Figure 25:
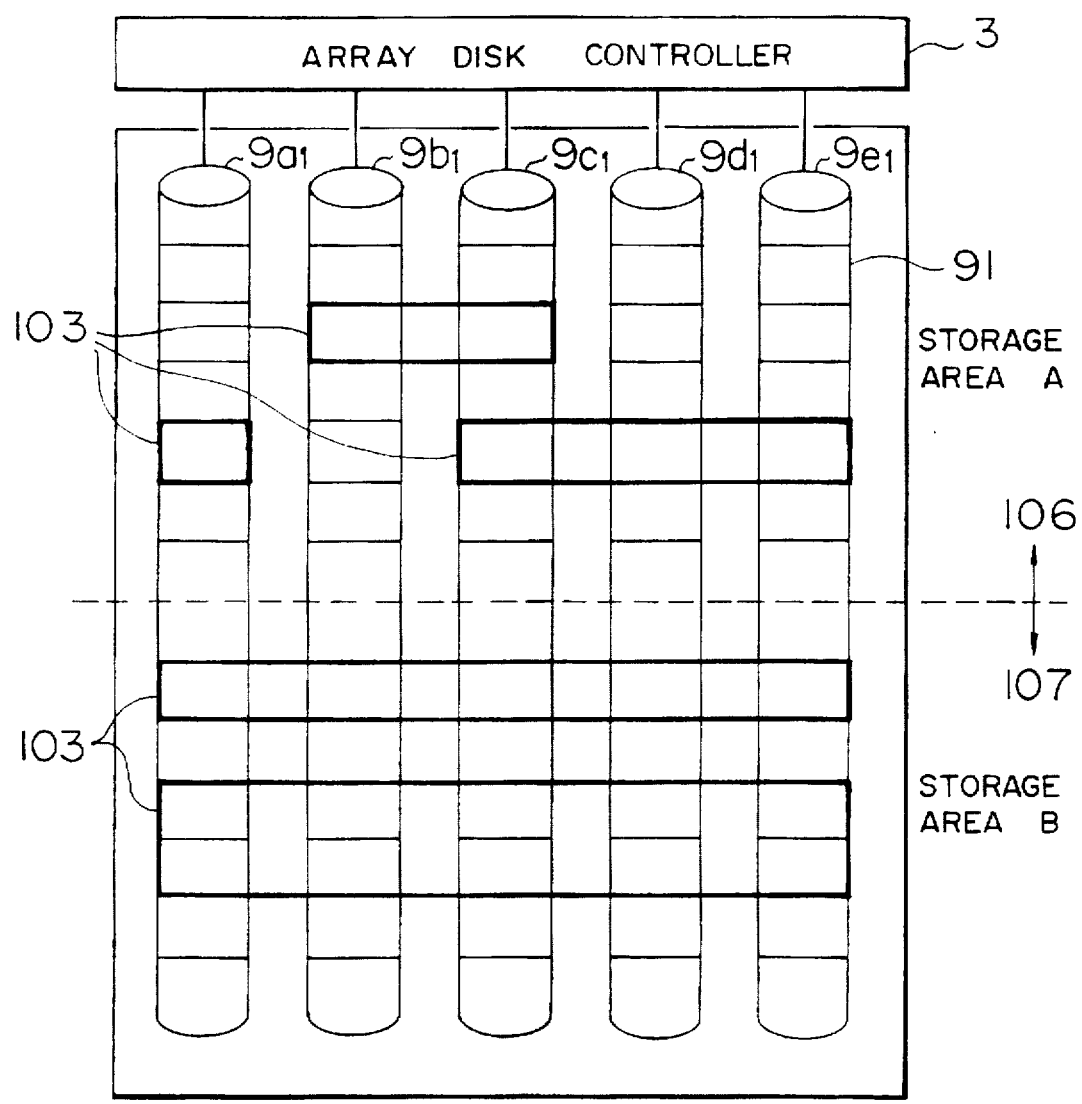
FIG. 25 is a diagram for explaining an example of the intended access data distribution in an array disk system.

Now, explanation will be made, with reference to FIG. 25, about the case in which an improved RMW processing performance is realized by designating a data storage area in a disk unit from the data transfer length. According to this embodiment, the data storage area of a disk unit is designated by the unit data transfer length supplied from the host computer 1. In FIG. 25, storage area A designated by 106 for storing transfer data when the unit transfer data length is an integral multiple of the data stripe size of a disk unit but not an integral multiple of the data size constituting a row in an array disk system 2, and a storage area B designated by 107 for storing the transfer data when the unit transfer data length is an integral multiple of the data stripe size making up one row in the array disk system 2.

The I/O demand from the host computer 1 to the disk unit is realized normally with a given block size as a unit, and the disk unit manages the stored data by a given block size. Further, the management at the array disk system 2 is realized by the size of the cluster or sector of a disk of each disk unit, the data stripe size made up of one or more disk blocks and the data size of a row made up of a predetermined number of stripes. The RMW processing is required when all of the data sizes making up a row of a given stripe in the array disk system mentioned above, i.e., when an unintended access data stripe is present or, in other words, when there is a data transfer start/end section in the particular row.

Nevertheless, even when the transfer data demand length from the host computer 1 is an integral multiple of the data size of a row of a stripe in an array disk system, a data transfer start/end section may be present depending on the designation of a data storage area in a disk unit.

According to the embodiment under consideration, a plurality of storage areas (two storage areas, for example, in FIG. 25) are formed in order to make a data storage area selectable in accordance with the transfer data length in an array disk system so that the particular storage area is designated in accordance with the same transfer data length at the time of interpreting the I/O demand information from the host computer 1. When the unit transfer data is an integral multiple of a row, for instance, storage is made in the storage area B, whereby the unnecessary RMW processing is reduced, thus improving the performance of an array disk system.

Explanation will be made for when the magnetic head position is used as selection information. In realizing the read operation of the data transfer start/end section with two read commands at the time of executing the RMW processing in the array disk system 2, the performance is expected to depend on the order of access of the data transfer start/end section. More specifically, in accessing the data transfer start/end section, the performance of the array disk system can be improved by minimizing the seek processing time of the magnetic head. The minimization of the seek processing time is realizable by controlling the order of access of the access section.

The array disk system according to this embodiment comprises position information detection means for detecting the magnetic head position information of each disk unit having generated an access demand therein and the storage position information of intended data associated with the access demand thus generated, and magnetic head movement amount detection means for detecting the amount of magnetic head movement for access, wherein the required amount of movement and the position of a magnetic head at the time of receiving an I/O demand from the host computer is detected and the order of disk I/O demand information issue is controlled in such a manner as to minimize the seek processing time of the magnetic head during the issue of a read access demand at the data transfer start/end section.

As described above, the performance of an array disk system is improved by detecting the position of a magnetic head and controlling the order of disk I/O demand information issue.

Figure 26:
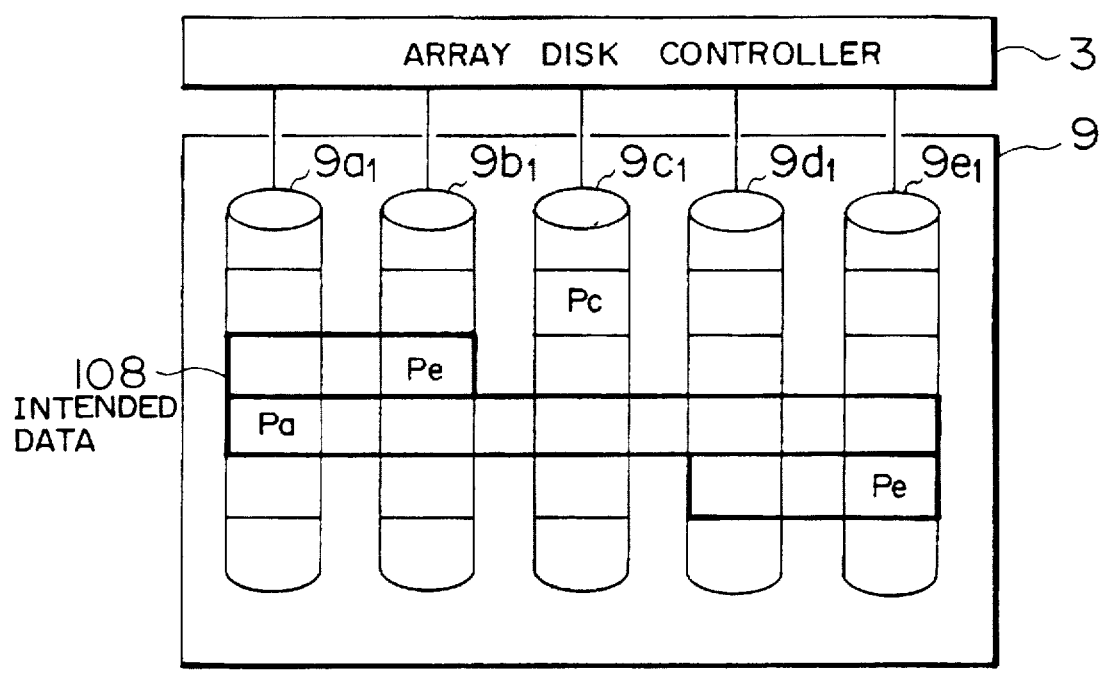
FIG. 26 is a diagram for explaining an example of the intended access data distribution in an array disk system.

Now, explanation will be made, with reference to FIGS. 21 and 26, for when a storage area of an intended access data in a disk unit is detected by the I/O demand information from the host computer 1 and the distribution of the RMW access area is used as selection information. FIG. 26, like FIG. 21, is a diagram showing an access area requiring the RMW processing for a plurality of rows of the start/end section.

In the case of FIG. 21, if the intended data of the start section and end section of the disk units 9a1 to 9e1 are to be read, it is necessary either to issue two read commands to both the start and end sections or to read all the data at the start section, mid-transfer section and end section and then neglect the data at the mid-transfer section with a single command. As for the unintended data of the start section/mid-section requiring the RMW processing, however, no single disk unit includes the start/end section. More specifically, the start section and the end section are not superposed one on the other in the same disk unit. As a result, to the extent that a parity data is generated by use of the unintended data section at the time of generation of the RMW processing demand to the access area, the RMW processing is realized with a single read command without any wasteful processing (including two read command issues or neglecting the mid-transfer section data).

In the case shown in FIG. 26, on the other hand, the unintended data for RMW processing at a row of the start section and end section of a disk unit covers a plurality of rows, and therefore the RMW processing can be optimized by issuing one read command to the intended data of the start section and end section unlike in the case of FIG. 21.

An example of the order of selection stored in the RMW processing selection procedure information storage section 34 of FIG. 22 is shown in FIG. 27.

In FIG. 27, step 110 checks whether or not the RMW processing is necessary by a command from the host computer 1. If the RMW processing is not necessary, the normal write operation or other processing is executed. If the RMW processing is required, on the other hand, the process is passed to step 111.

Step 111 checks whether the access to a plurality of rows is involved or not. If the access is not to a plurality of rows, the process proceeds to step 114. Step 114 compares the number of disk units storing data intended for access with the number of disk units storing the data not intended for access. If step 114 decides that the number of intended access disk units is larger than the number of unintended access disk units, the process is passed to step 118 for executing the reconstruction processing to collectively read the unintended access data for the particular row. If the answer at step 114 is "NO", by contrast, the process proceeds to step 119 and all the intended access data for the particular row are read collectively.

When step 111 decides that the access is to a plurality of rows, the process is passed to step 112. Step 112 checks whether the transfer data length for a write demand exceeds a predetermined value X or not. If step 112 decides that the demand transfer data length does not exceed the predetermined value X, the process is passed to step 115 for checking whether or not at least one data strip is duplicated at the start section and the end section.

If the answer at step 115 is "YES", the process proceeds to step 118 to execute the write operation including the collective read operation of an unintended access data for the start section and the end section. If the answer at step 115 is "NO", on the other hand, the process proceeds to step 119, where the write operation including the collective reading of an intended access data for the start section and the end section is executed.

When step 112 decides that the demand transfer data length exceeds the predetermined value X, the process is passed to step 113.

Step 113 checks whether or not there exists at least a data stripe duplicated at the start section and the end section. If there is found any duplication, the process proceeds to step 116 to perform the reconstruction processing for reading the unintended access data for the start section and the end section separately. If there is found no duplication, the process is passed to step 117, where the RMW process is performed for reading the intended access data for the start section and the end section separately. The procedure shown in FIG. 27 is executed by the optimum RMW processing selection section 35 in FIG. 22.

The steps 111, 112 and 113 shown in FIG. 27 need not be in the order shown, but may be executed in any other order in accordance with the system conditions.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An array disk controller to which a plurality of disk units are connected, comprising:

means for receiving a host command from a host computer and notifying an end of the host command to said host computer;

means for temporarily storing host commands successively issued by the host computer in a queue;

means for extracting and grouping, from among the host commands stored in said queue, host commands requesting access to a continuous data area, and producing disk commands to be distributed to said disk units according to the extracted and grouped host commands as a single new virtual host command;

means for issuing said disk commands to said disk units and detecting whether data transfer due to read/write operation by said disk commands have ended, said means for issuing said disk commands issues said disk read commands to said disk units to collectively read old data and old parity information previously recorded in said continuous data area;

a parity generator for generating new parity information based on said old data, said old parity information and new data to be written, by using an exclusive OR logical operation;

wherein said extracting and grouping means produces disk write commands to be distributed to said disk units using said single new virtual write command; and wherein said means for issuing said disk commands issues said disk write commands to said disk units to collectively write new data and said new parity information in said continuous data area; and means for storing and managing information as to relationships between said single new virtual host command and said disk commands;

wherein a number of accesses to said disk units can be reduced because said host commands accessing said continuous data area issued by said host computer are regarded as a single new virtual host command within said array disk controller.

2. An array disk controller to which a plurality of disk units are connected, comprising:

means for receiving a host command from a host computer requesting access to data stored in j disk units (j: an integer; J≧1) connected to said array disk controller, and notifying an end of the host command to said host computer;

means for temporarily storing host commands successively issued by the host computer in a queue;

means for extracting and grouping, from among the host commands stored in said queue, m host commands (m: an integer; m≧2) requesting access to a continuous data area, and producing k disk commands respectively corresponding to k disk units (k: an integer; k≧j) according to the extracted and grouped host commands as a single new virtual host command;

means for issuing said disk commands substantially concurrent to said k disk units so as to operate said k disk units in parallel and detecting whether data transfer due to read/write operation by said disk commands have ended; and means for storing and managing information as to relationships between said single new virtual host command and said k disk commands;

wherein said m host commands accessing said continuous data area issued by said host computer are regarded as a single new virtual host command within said array disk controller, and thus time of disk latencies in said disk units is reduced substantially to 1/m compared to when said m host commands are executed individually, the grouped m host commands accessing to a continuous data area are data read commands and are regarded as a single new virtual read command, said extracting and grouping means produce k disk read commands to be distributed to said k disk units using said single new virtual read command, said disk commands issuing means issues said k disk read commands to said k disk units, and said continuous data area is read collectively by said disk units as a single data block, and thus read at a data transfer rate which is faster by a factor f=k/j compared to when said m host commands are executed individually.

3. An array disk controller to which a plurality of disk units are connected, comprising:

means for receiving a host command from a host computer and notifying an end of the host command to said host computer;

means for temporarily storing host commands successively issued by the host computer in a queue;

means for extracting and grouping, from among the host commands stored in said queue host commands requesting access to a continuous data area and producing disk commands for said disk units according to the extracted and grouped host commands as a single new virtual host command;

means for issuing said disk commands to said disk units and detecting whether data transfer due to read/write operation by said disk commands have ended; and means for storing and managing information as to relationships between said single new virtual host command and said disk commands;

wherein a number of accesses to said disk units can be reduced because said host commands accessing said continuous data area issued by said host computer are regarded as a single new virtual host command within said array disk controller, the grouped host commands accessing to a continuous data area are data write commands, and are regarded as a single new virtual write command, said extracting and grouping means selects, from said continuous data area, a parity group which is a data area including all data stripes stored in said respective disk units at a same logical start address; and said array disk controller further comprises a parity generator for generating a new parity strip based on said parity group using an exclusive OR logical operation, without reading data stripes corresponding to said parity group from said disk units; wherein further said extracting and grouping means produces disk write commands to be distributed to said disk units by using said single new logical write command; and said disk commands issuing means issues said disk write commands to said disk units to collectively write new data stripes and said new parity stripe in a data area storing old data stripes and an old parity stripe of said disk units.

4. An array disk controller to which a plurality of disk units are connected, comprising:

means for receiving a host command from a host computer and notifying an end of the host command to said host computer;

means for temporarily storing host commands successively issued by said host computer in a queue;

means for extracting and grouping, from among the host commands stored in said queue, host commands requesting access to a continuous data area, and for converting the extracted and grouped host commands into a single new host command, and producing disk commands to be distributed to said disk units using said single new host command;

means for issuing said disk commands to said disk units and detecting whether data transfer due to read/write operation by said disk commands have ended, said means for issuing said disk commands issues said disk read commands to said disk units to collectively read old data and old parity information previously recorded in said continuous data area;

a parity generator for generating new parity information based on said old data, said old parity information and new data to be written, using an exclusive OR logical operation;

wherein said extracting and grouping means produces disk write commands to be distributed to said disk units using said single new write command; and wherein said means for issuing said disk commands issues said disk write commands to said disk units to collectively write new data and said new parity information in said continuous data area; and means for storing and managing information regarding relationships between said single new host command and said disk commands;

wherein a number of accesses to said disk units can be reduced because a single new host command is created from said host commands grouped accessing to said continuous data area within said array disk controller.

5. An array disk controller to which a plurality of disk units are connected, comprising:

means for receiving a host command requesting access to data stored in j disk units (j: an intender; j≧1) connected to said array disk controller, from a host computer and notifying an end of the host command to said host computer;

means for temporarily storing host commands successively issued by said host computer in a queue;

means for extracting and grouping, from among the host commands stored in said queue, m host commands (m: an integer; m≧2) requesting access to a continuous data area, and for converting the extracted and grouped host commands into a single new host command, and producing k disk commands respectively corresponding to said k disk units (k: an integer; k≧j) using said single new host command;

means for issuing said disk commands substantially concurrent to said disk units so as to operate said k disk units in parallel, and detecting whether data transfer due to read/write operation by said disk commands have ended; and means for storing and managing information regarding relationships between said single new host command and said disk commands;

wherein a single new host command is created from said m host commands grouped accessing to said continuous data area within said array disk controller, and thus time of disk latencies in said disk units is reduced substantially to 1/m compared to when said m host commands are executed individually, the grouped m host commands accessing to a continuous data area are data read commands and are converted into single new read command therefrom, said extracting and grouping means produces k disk read commands to be distributed to said k disk units using said single new read command, and said disk commands issuing means issues said k disk read commands to said k disk units, wherein said continuous data area is read collectively by said k disk units as a single data block, and thus read at a data transfer rate which is faster by a factor f=k/j compared to when said m host commands are executed individually.

6. An array disk controller to which a plurality of disk units are connected, comprising:

means for receiving a host command from a host computer and notifying an end of the host command to said host computer;

means for temporarily storing host commands successively issued by said host computer in a queue;

means for extracting and grouping, from among the host commands stored in said queue host commands requesting access to a continuous data area, and for converting the extracted and grouped host commands into a single new host command, and a disk command to said disk units using said single new host command;

means for issuing said disk commands to said disk units and detecting whether data transfer due to read/write operation by said disk commands have ended; and means for storing and managing information regarding relationships between said single new host command and said disk commands;

wherein a number of accesses to said disk units can be reduced because a single new host command is created from said host commands grouped accessing to said continuous data area within said array disk controller, the grouped host commands accessing to a continuous data area are data write commands and are converted into a single new write command, said extracting and grouping means selects, from said continuous data area, a parity group which is a data area constituted by all data stripes stored in said respective disk units at a same logical start address, and said array disk controller further comprises a parity generator for generating a new parity stripe based on said parity group by using exclusive OR logical operation, without reading data stripes corresponding to said parity group from said disk units, wherein further said extracting and grouping means produces disk write commands to be distributed to said disk units using said single new write command, and said disk commands issuing means issues said disk write commands to said disk units to collectively write new data stripes and said new parity stripe in a data area storing old data stripes and old parity stripe of said disk units.

7. An array disk controller to which a plurality of disk units are connected, comprising:

means for receiving a host command from a host computer requesting access to data stored in j disk units (j: an integer; $j \geq 1$) connected to said array disk controller, and notifying an end of the host command to said host computer;

means for temporarily storing host commands successively issued by the host computer in a queue;

means for extracting and grouping, from among the host commands stored in said queue, m host commands (m: an integer; $m \geq 2$) requesting access to a continuous data area, and producing k disk commands respectively corresponding to k disk units (k: an integer; $k \geq j$) according to the extracted and grouped host commands as a single new virtual host command;

means for issuing said disk commands substantially concurrent to said disk units so as to operate said k disk units in parallel, and detecting whether data transfer due to read/write operation by said disk commands has ended; and means for storing and managing information regarding relationships between said single new virtual host command and said k disk commands;

wherein said m host commands accessing said continuous data area issued by said host computer are regarded as a single new virtual host command within said array disk controller, and thus time of disk latencies in said disk units is reduced substantially to 1/m as compared with when said m host commands are executed individually, the grouped m host commands accessing a continuous data area are data write commands and are regarded as a single new virtual write command, said extracting and grouping means produce k disk write commands to be distributed to said k disk units using said single new virtual write command, said disk commands issuing means issues and k disk write commands to said k disk units, and said continuous data area is written collectively by said k disk units as a single data block, and thus written at a data transfer rate faster by a factor $f=k/j$ as compared with when said m host commands are executed individually.

8. An array disk controller to which a plurality of disk units are connected, comprising:

means for receiving a host command requesting for access to data stored in j disk units (j: an integer; $j \geq 1$) connected to said array disk controller, from a host computer and notifying an end of the host command to said host computer;

means for temporarily storing host commands successively issued by the host computer in a queue;

means for extracting and groupings, from among the host commands stored in said queue, m host commands (m: an integer; $m \geq 2$) requesting access to a continuous data area, and for converting the extracted and grouped host commands into a single new host command, and producing k disk commands respectively corresponding to said k disk units (k: an integer; $k \geq j$) using said single new host command;

means for issuing said disk commands substantially concurrent to said disk units so as to operate said k disk units in parallel, and detecting whether data transfer due to read/write operation by said disk commands has ended; and means for storing and managing information regarding relationships between said single new host command and said disk commands;

wherein a single new host command is created from said m host commands grouped accessing said continuous data area within said array disk controller, and thus time of disk latencies in said disk units is reduced substantially to 1/m as compared with when said m host commands are executed individually, the grouped m host commands accessing a continuous data area are data write commands and are converted into single new write command therefrom, said extracting and grouping means produces k disk write commands to be distributed to said k disk units using said single new write command, said disk commands issuing means issues said k disk write commands to said k disk units, and wherein said continuous data are is written collectively by said disk units as a single data block, and thus written at a data transfer rate faster by a factor $f=k/j$ as compared with a case where said m host commands are executed individually.

* * * * *